Figure 1:
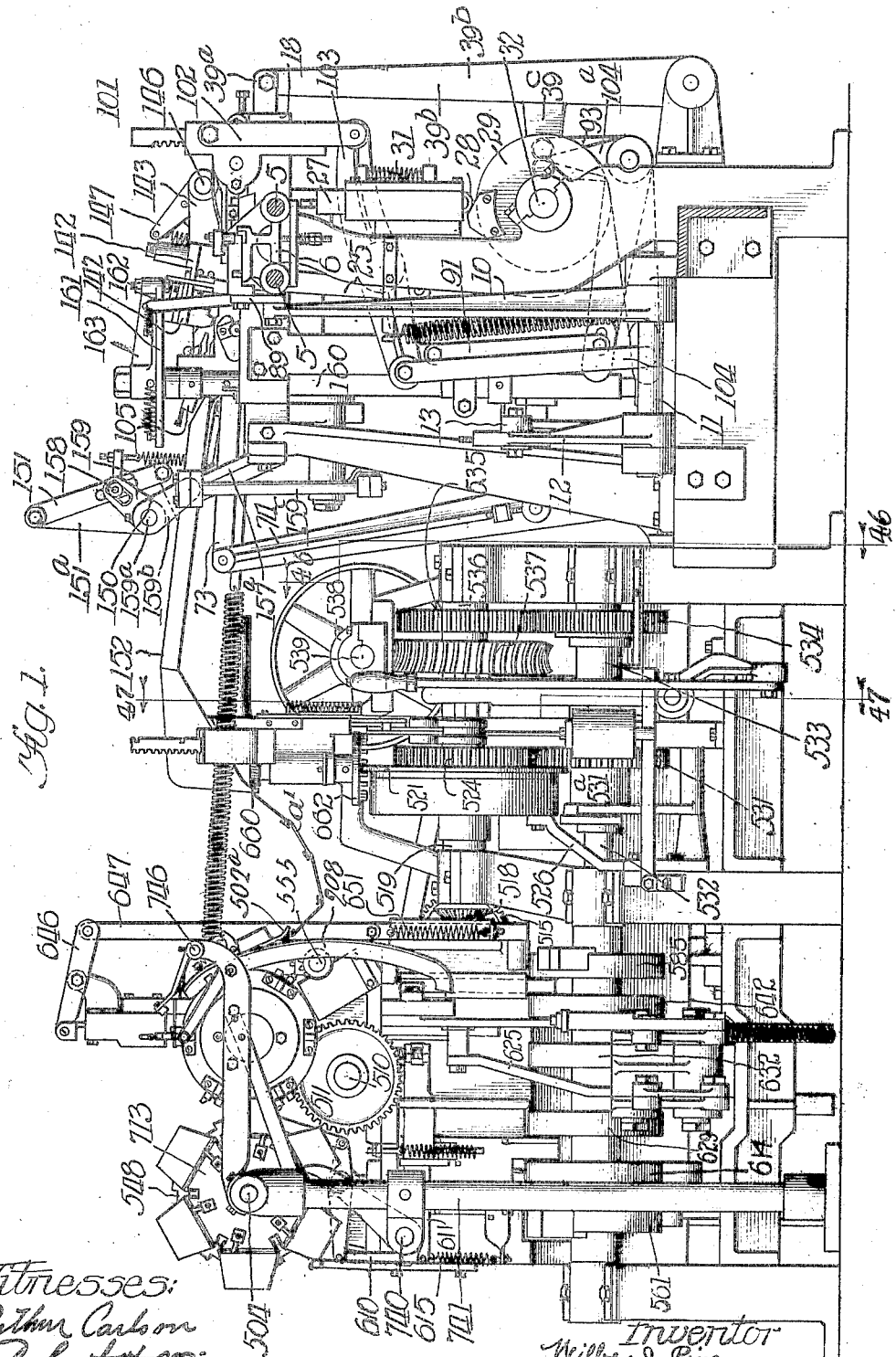

W. J. PINE.
MACHINE FOR MAKING WIRE FABRIC.
APPLICATION FILED AUG. 2, 1910.

1,068,075.

Patented July 22, 1913.
29 SHEETS—SHEET 1.

W. J. PINE.
MACHINE FOR MAKING WIRE FABRIC.
APPLICATION FILED AUG. 2, 1910.

1,068,075.

Patented July 22, 1913.
29 SHEETS—SHEET 7.

Witnesses
Arthur Carlson
Robert J. F. Weir

Inventor
Wilber J. Pine

W. J. PINE.
MACHINE FOR MAKING WIRE FABRIC.
APPLICATION FILED AUG. 2, 1910.

1,068,075.

Patented July 22, 1913.
29 SHEETS—SHEET 9.

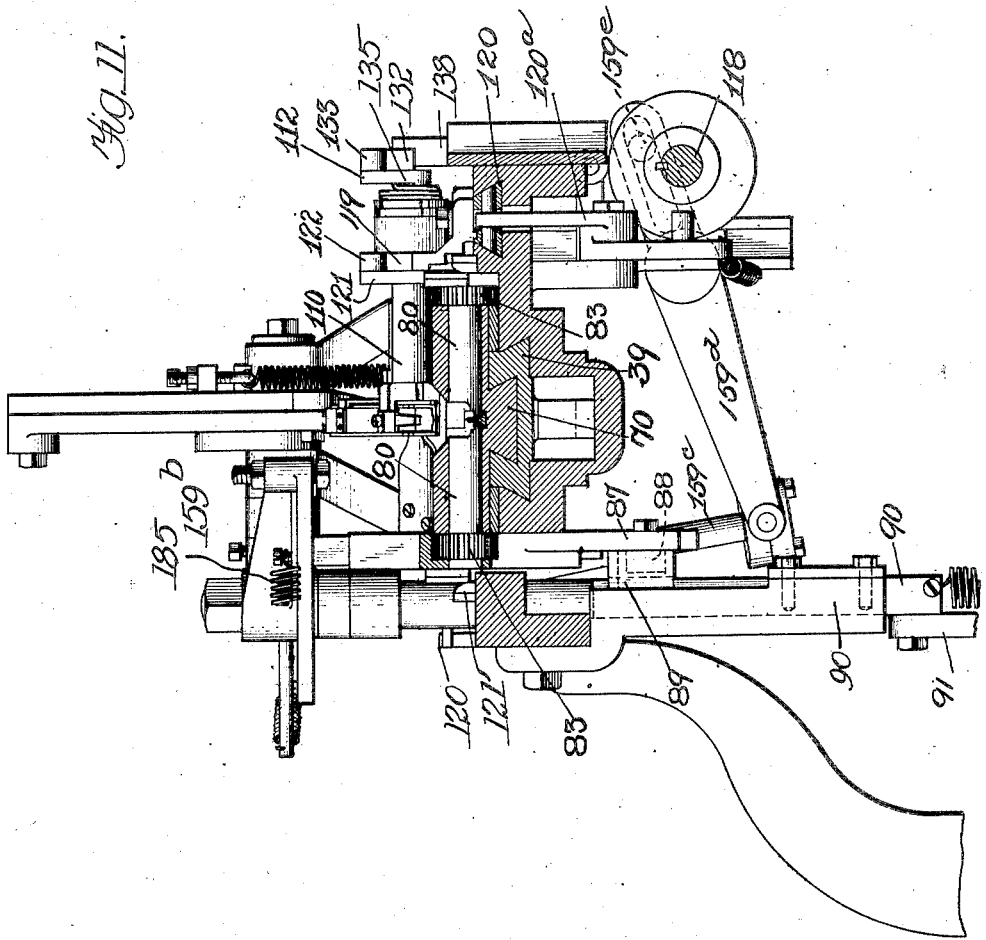

W. J. PINE.
MACHINE FOR MAKING WIRE FABRIC.
APPLICATION FILED AUG. 2, 1910.
1,068,075.
Patented July 22, 1913.
29 SHEETS—SHEET 11.
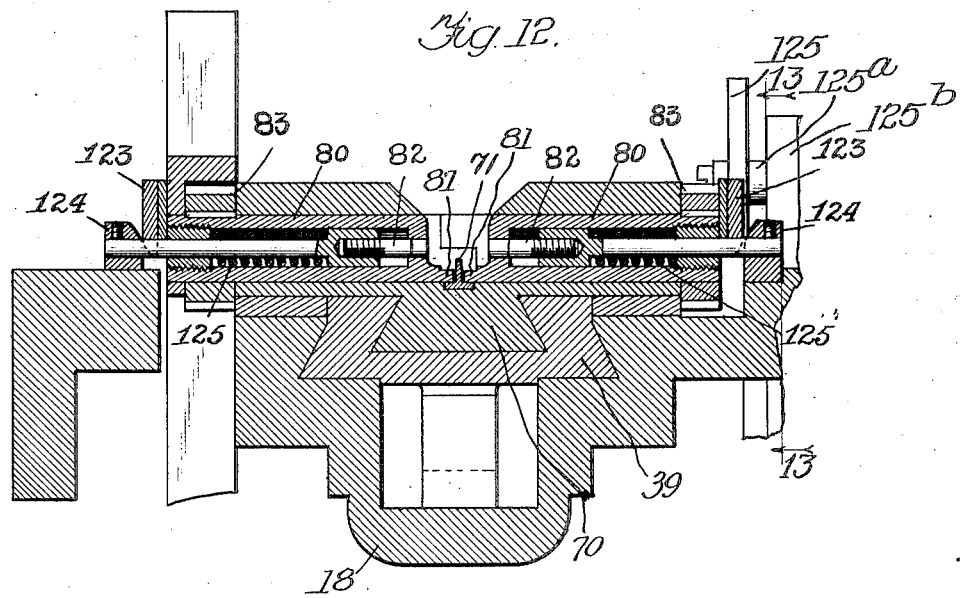
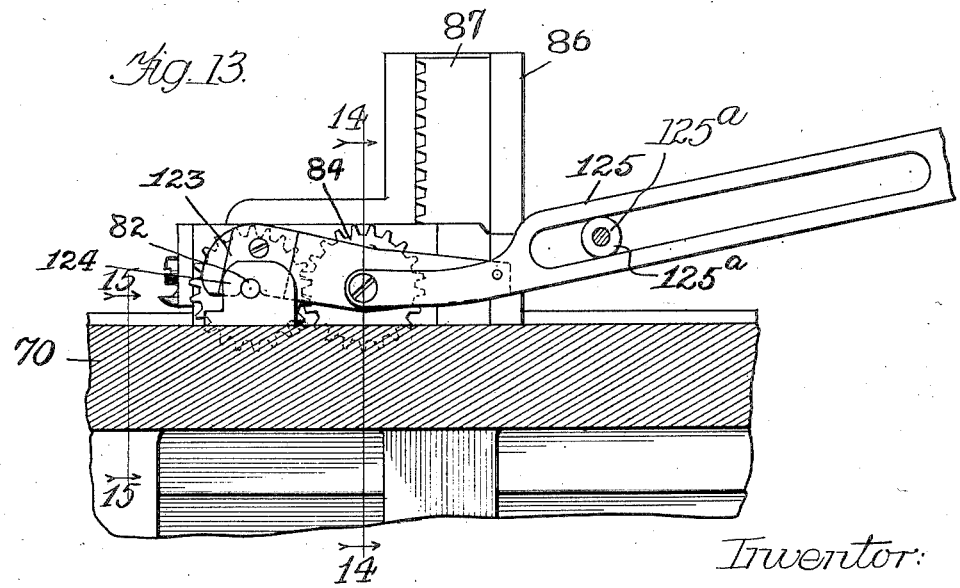

W. J. PINE.
MACHINE FOR MAKING WIRE FABRIC.
APPLICATION FILED AUG. 2, 1910.
1,068,075.
Patented July 22, 1913.
29 SHEETS—SHEET 12.
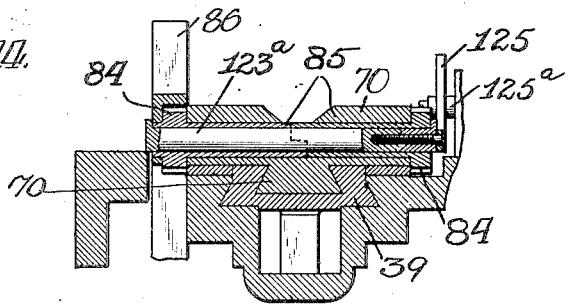
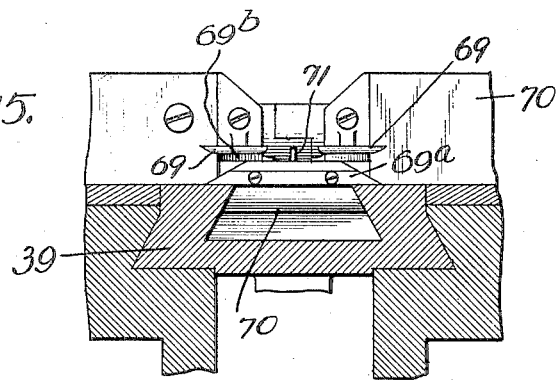
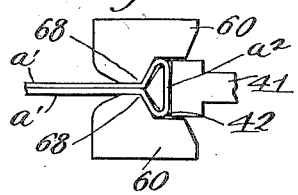
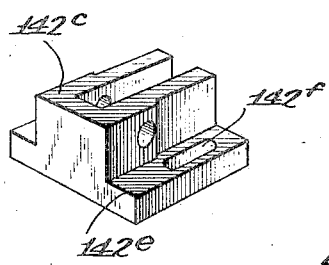
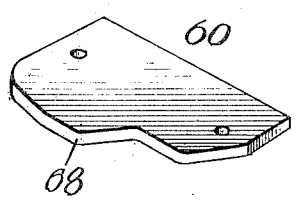
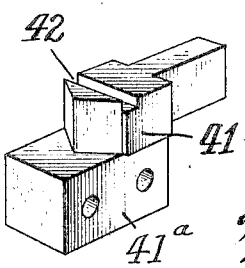

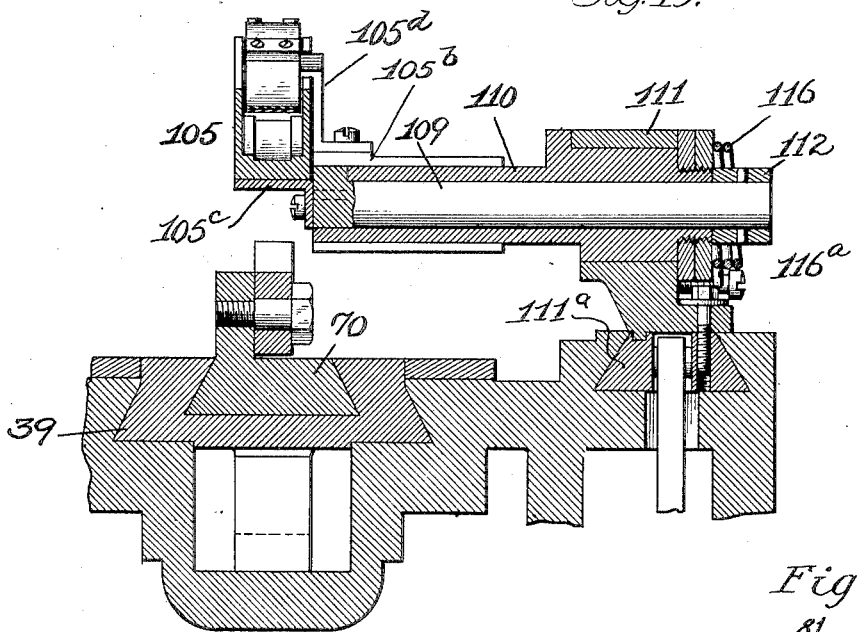
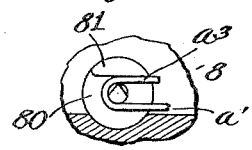
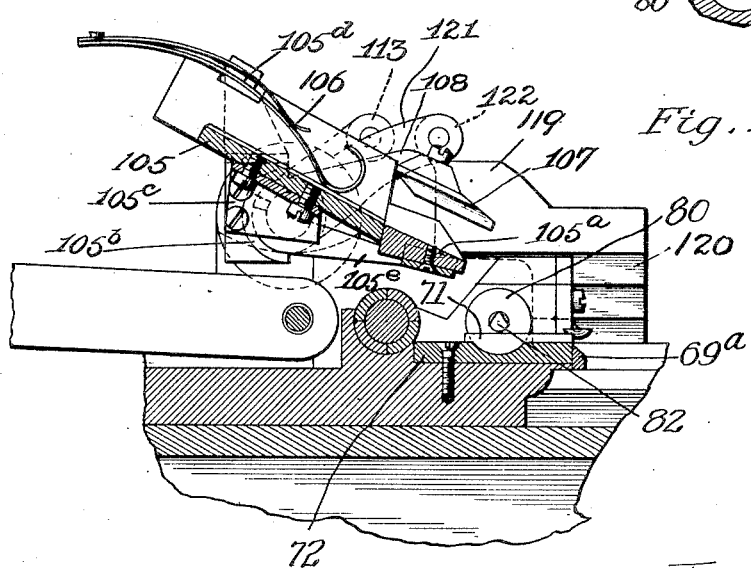

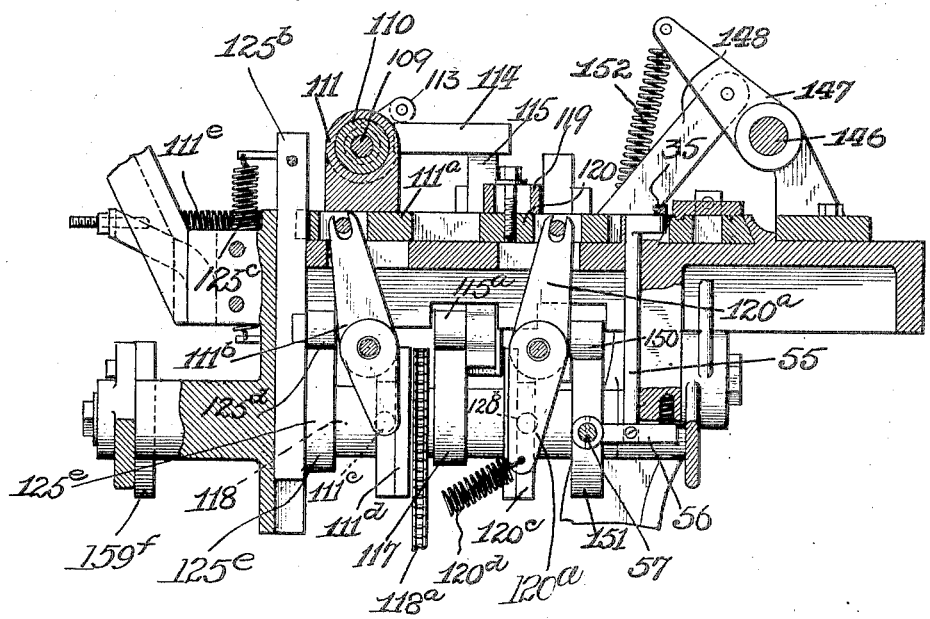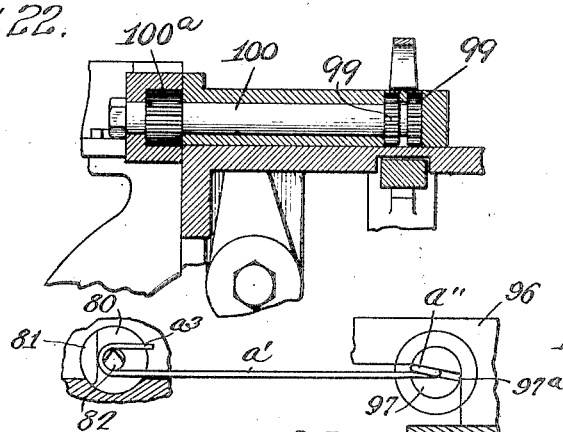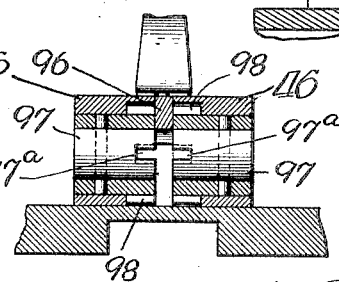

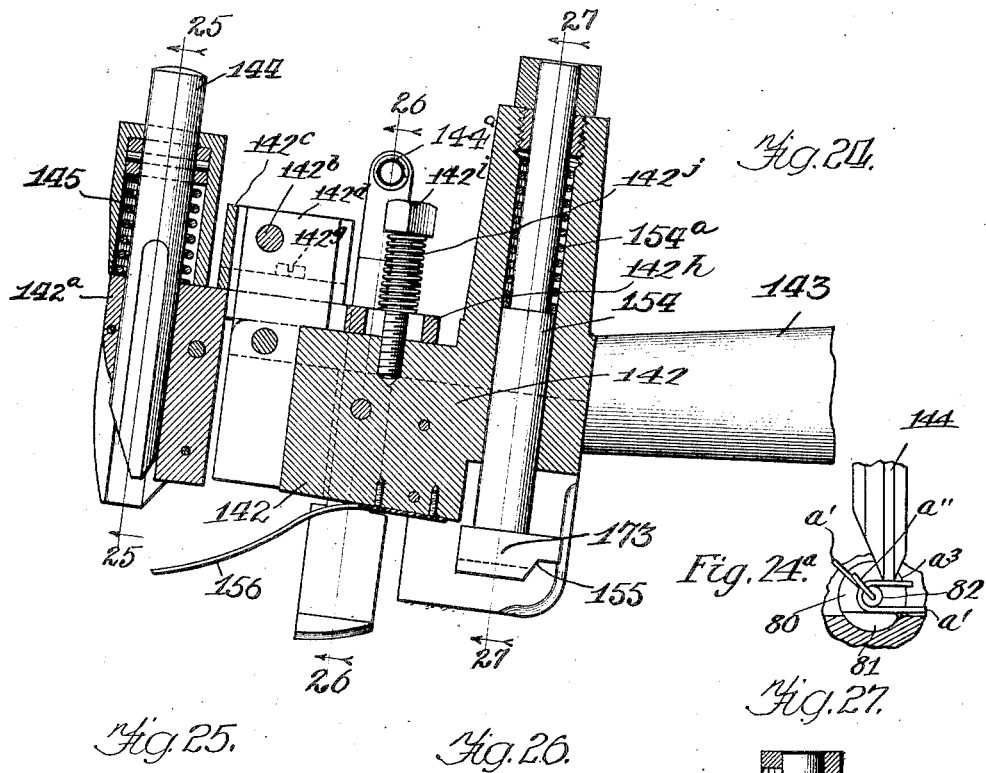

W. J. PINE.
MACHINE FOR MAKING WIRE FABRIC.
APPLICATION FILED AUG. 2, 1910.

1,068,075.

Patented July 22, 1913.
29 SHEETS—SHEET 16.

Witnesses
Arthur Carlson
Robert H Weir

Inventor
Wilber J. Pine
by Rector Hibben David Macauley
Attys

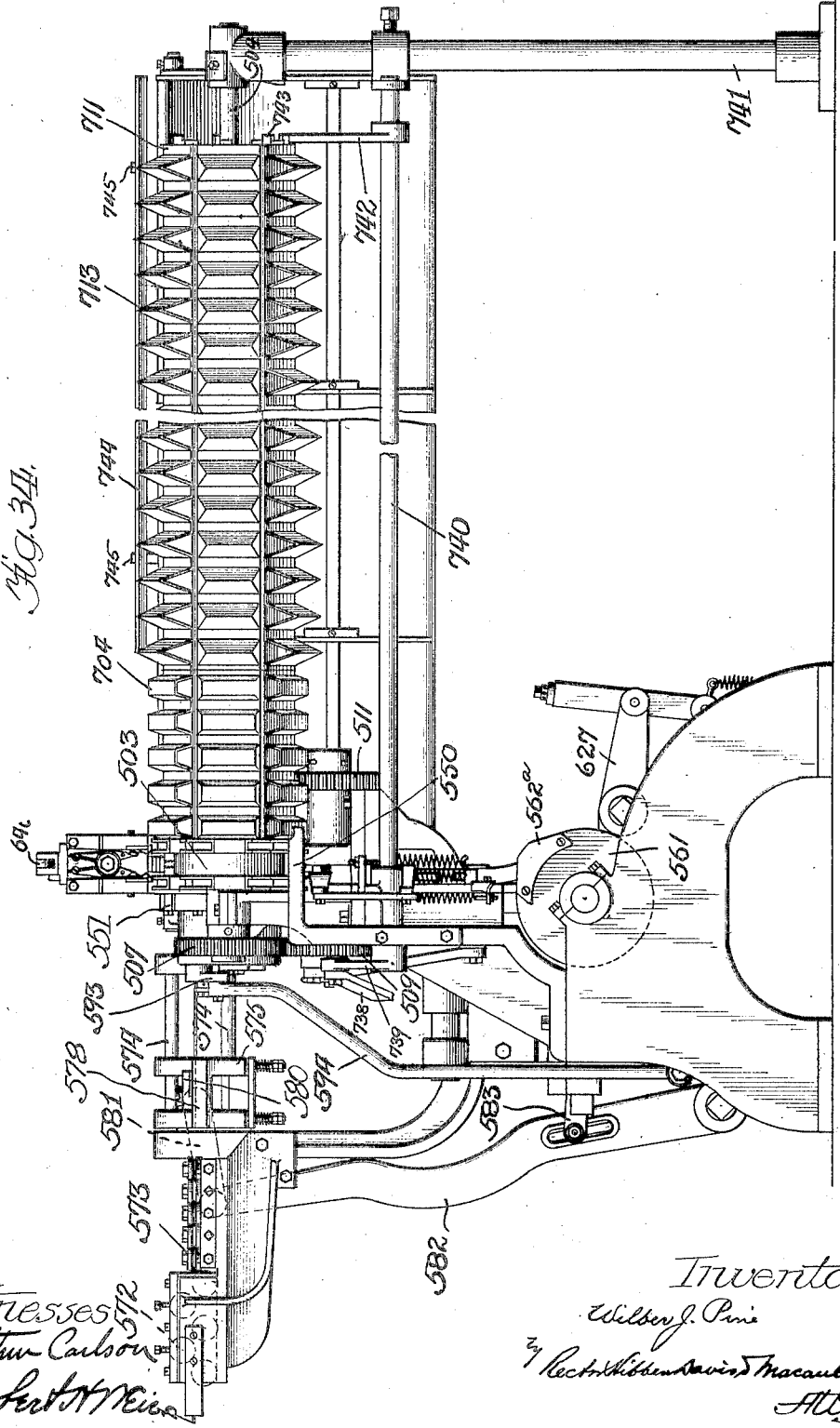

W. J. PINE.
MACHINE FOR MAKING WIRE FABRIC.
APPLICATION FILED AUG. 2, 1910.
1,068,075.
Patented July 22, 1913.
29 SHEETS—SHEET 18.
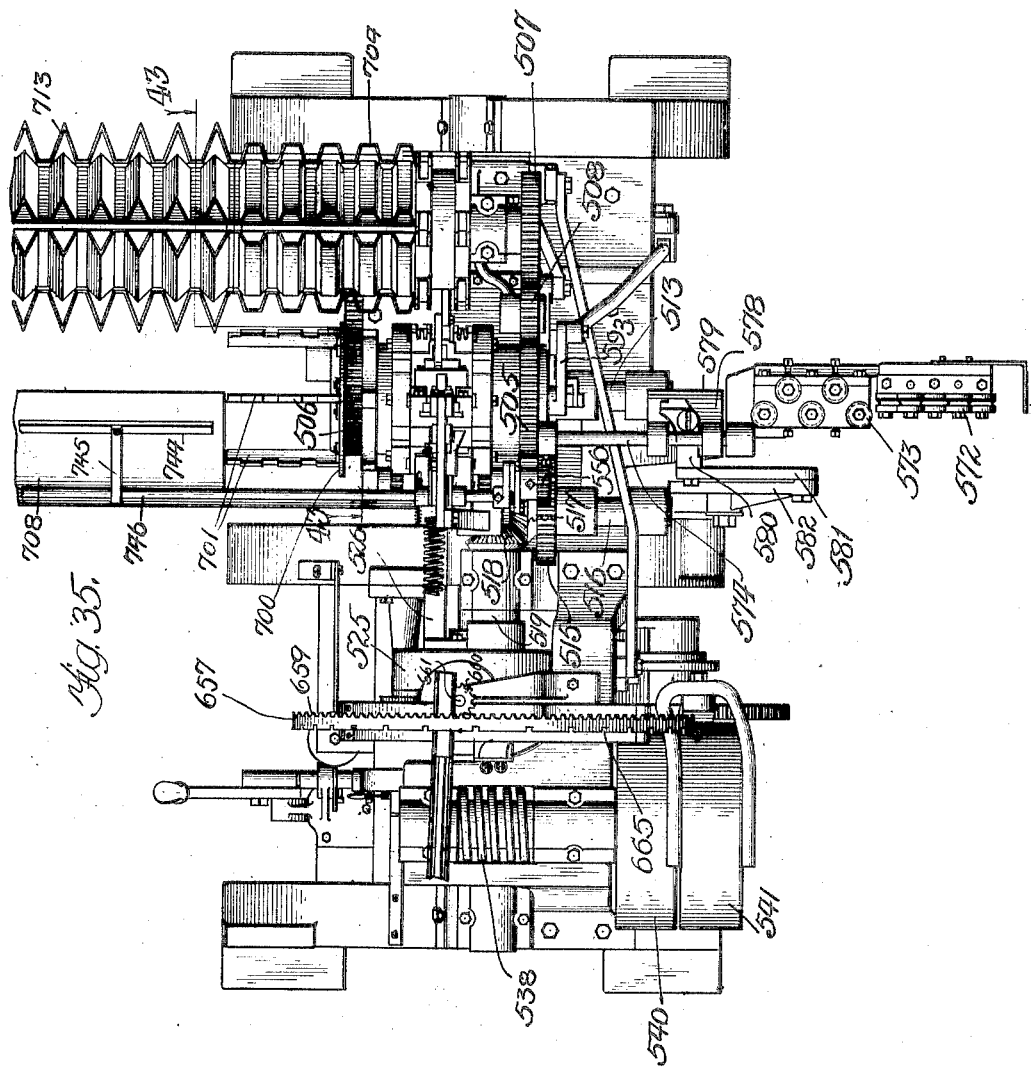

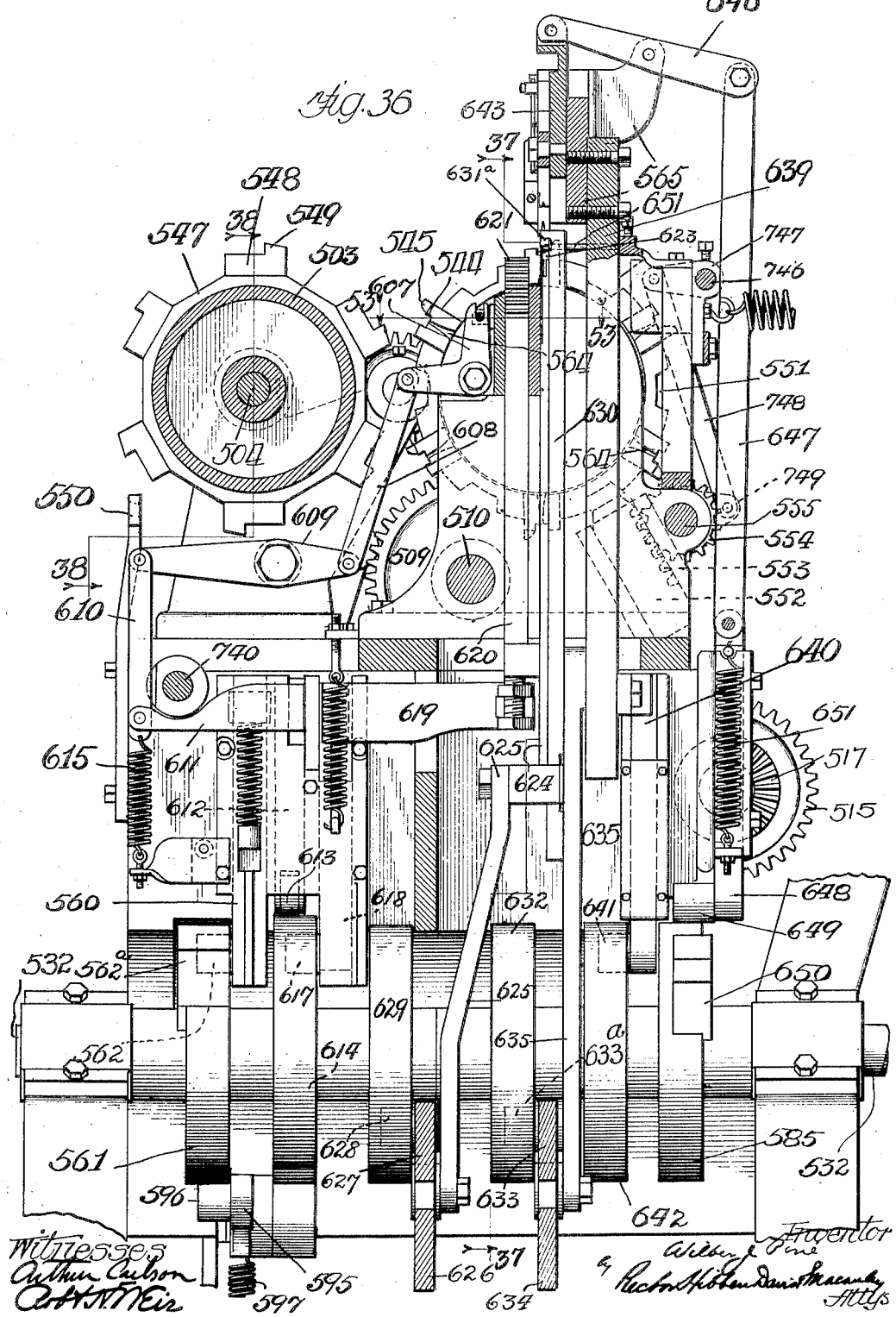

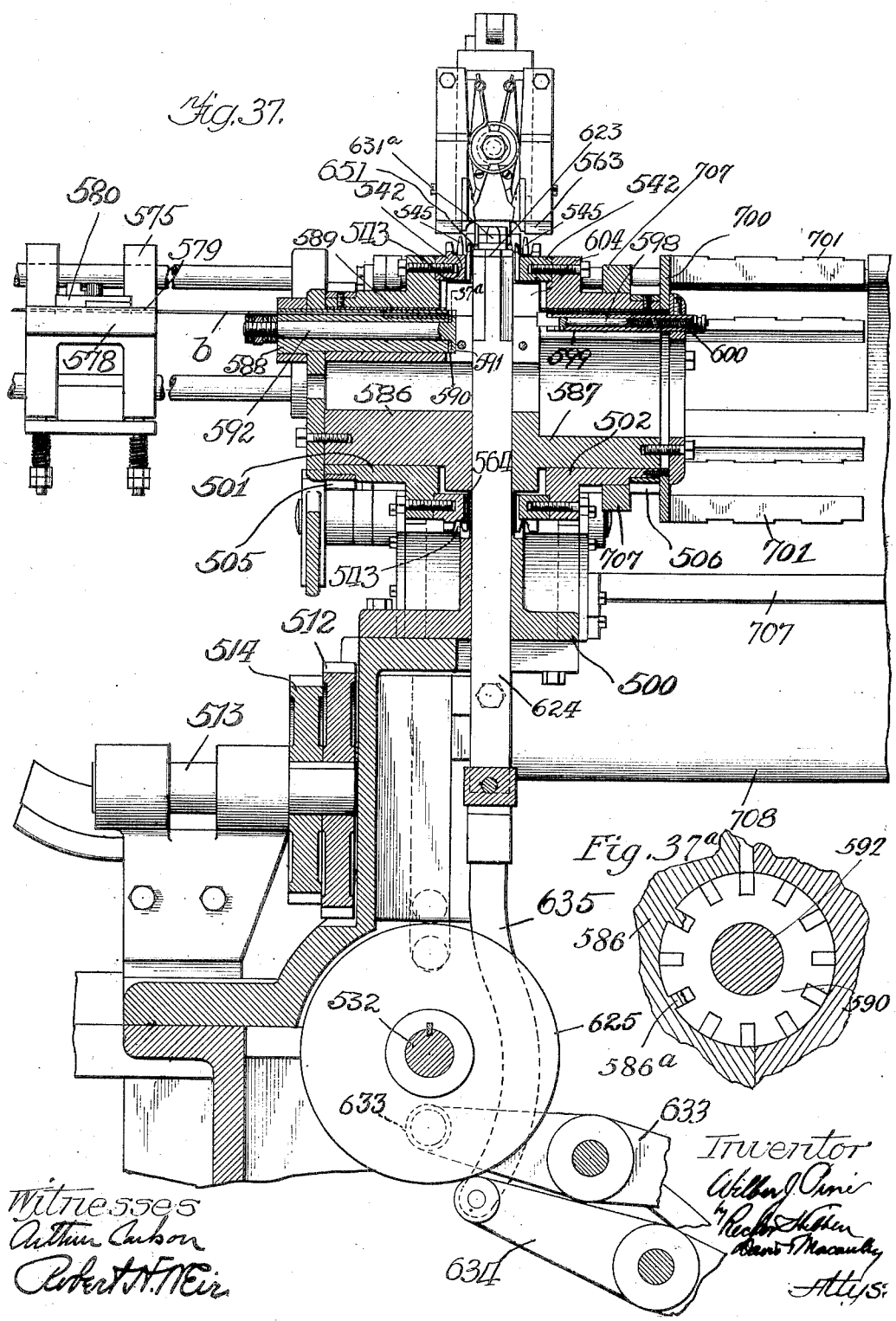

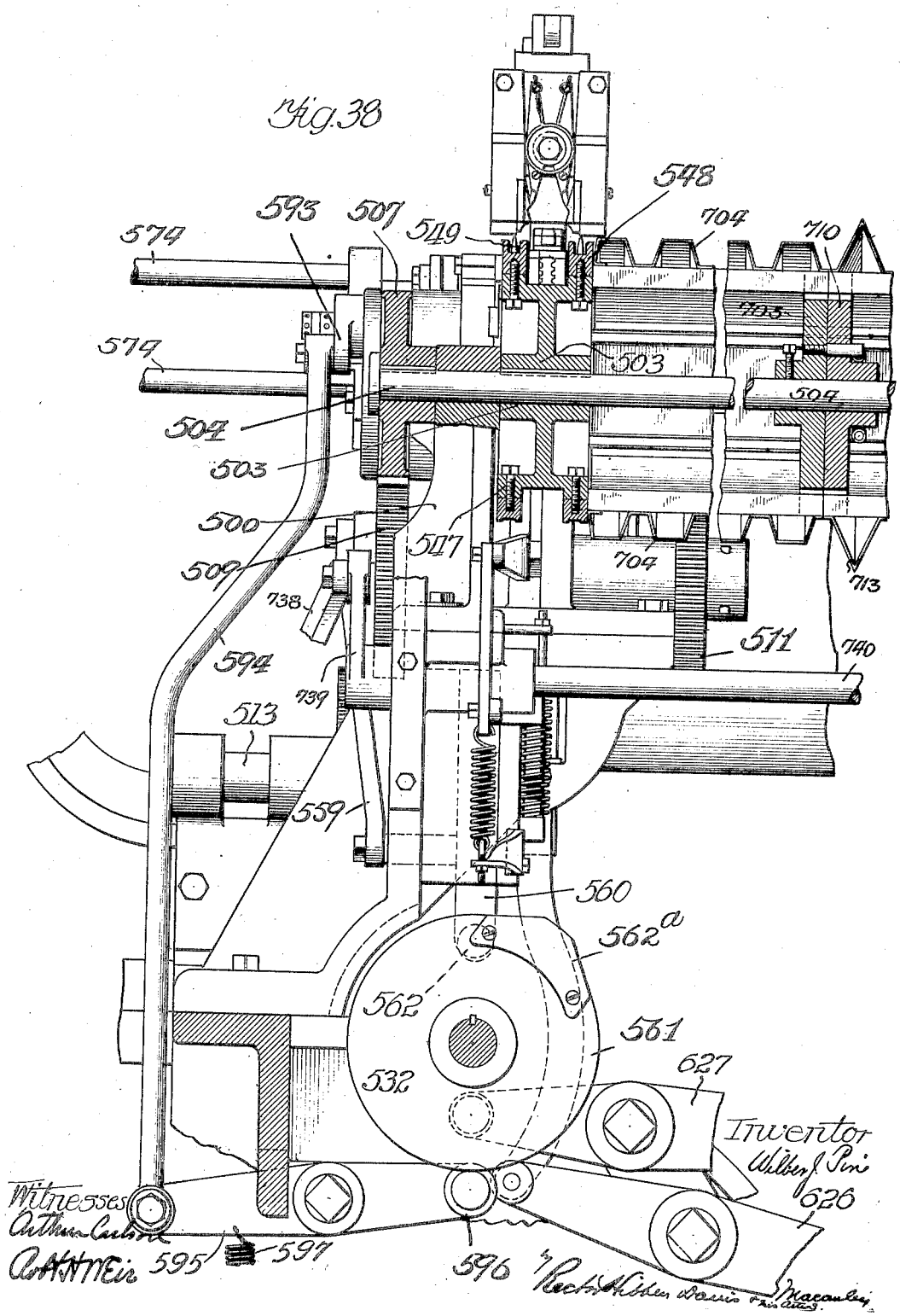

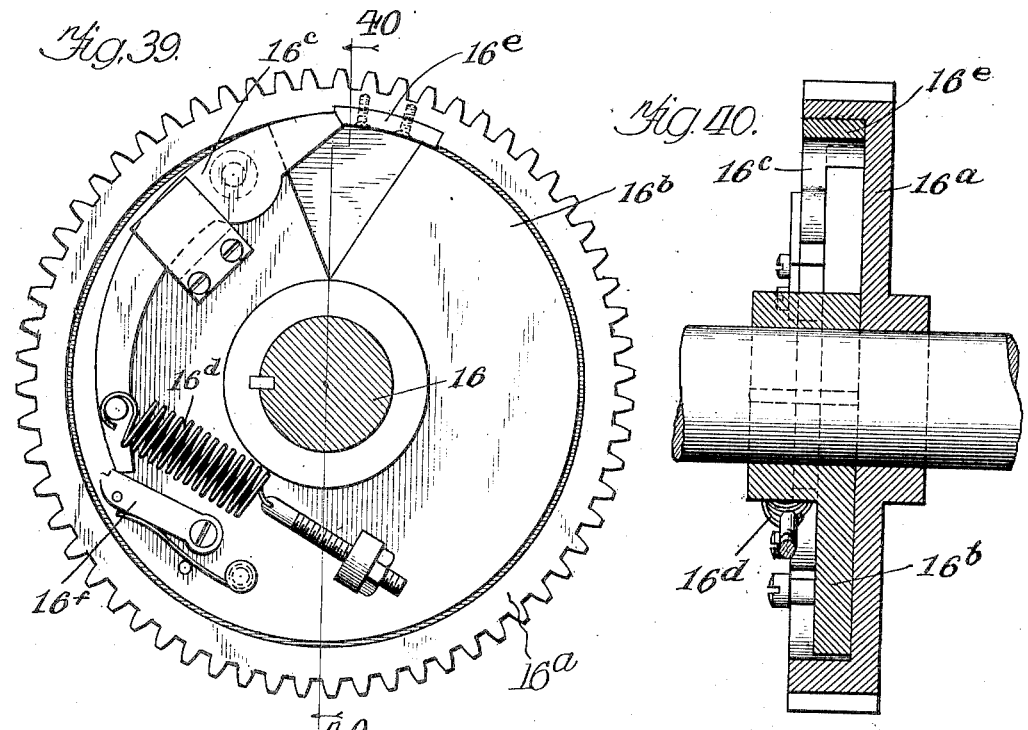
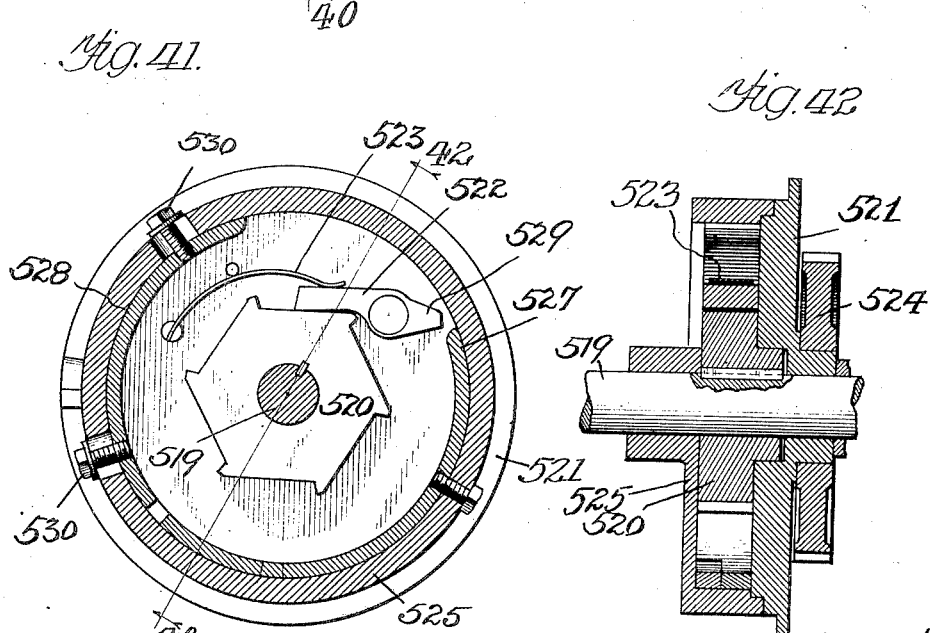

W. J. PINE.
MACHINE FOR MAKING WIRE FABRIC.
APPLICATION FILED AUG. 2, 1910.
1,068,075.
Patented July 22, 1913.
29 SHEETS—SHEET 23.
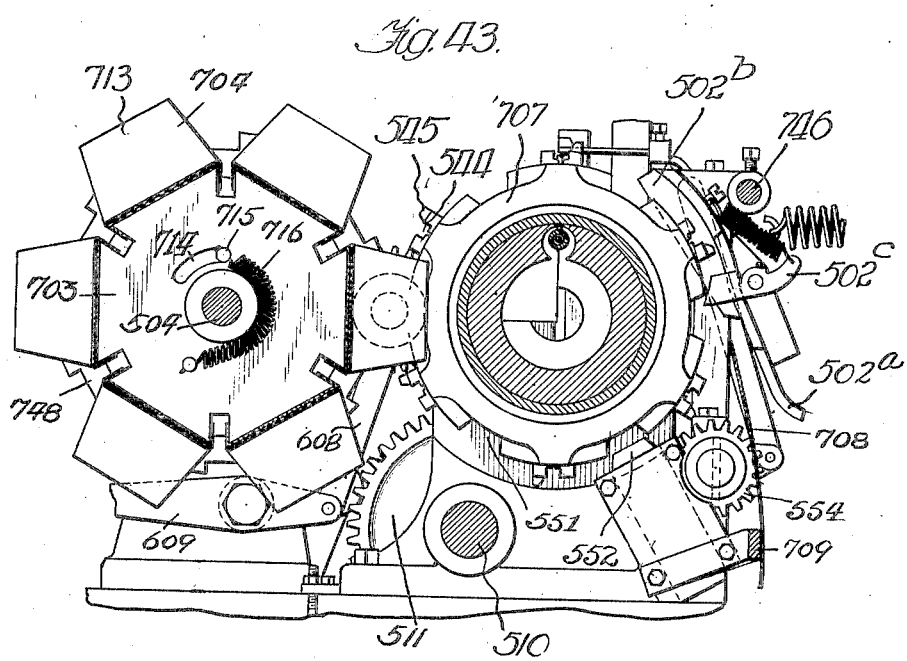
Fig. 43.
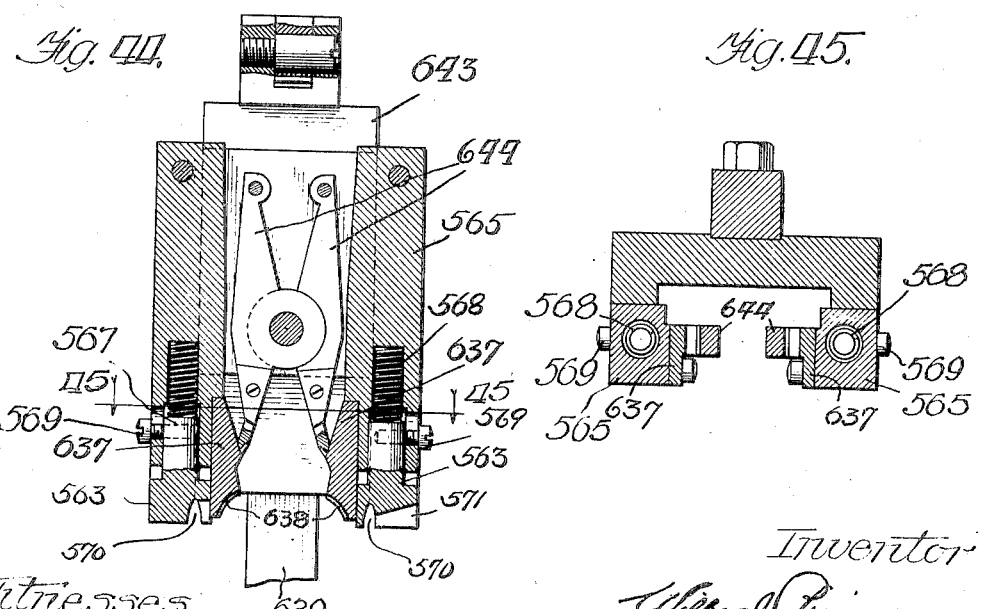
Fig. 44.
Fig. 45.
Witnesses
Inventor W. J. PINE.
MACHINE FOR MAKING WIRE FABRIC.
APPLICATION FILED AUG. 2, 1910.
1,068,075.
Patented July 22, 1913.
29 SHEETS—SHEET 24.
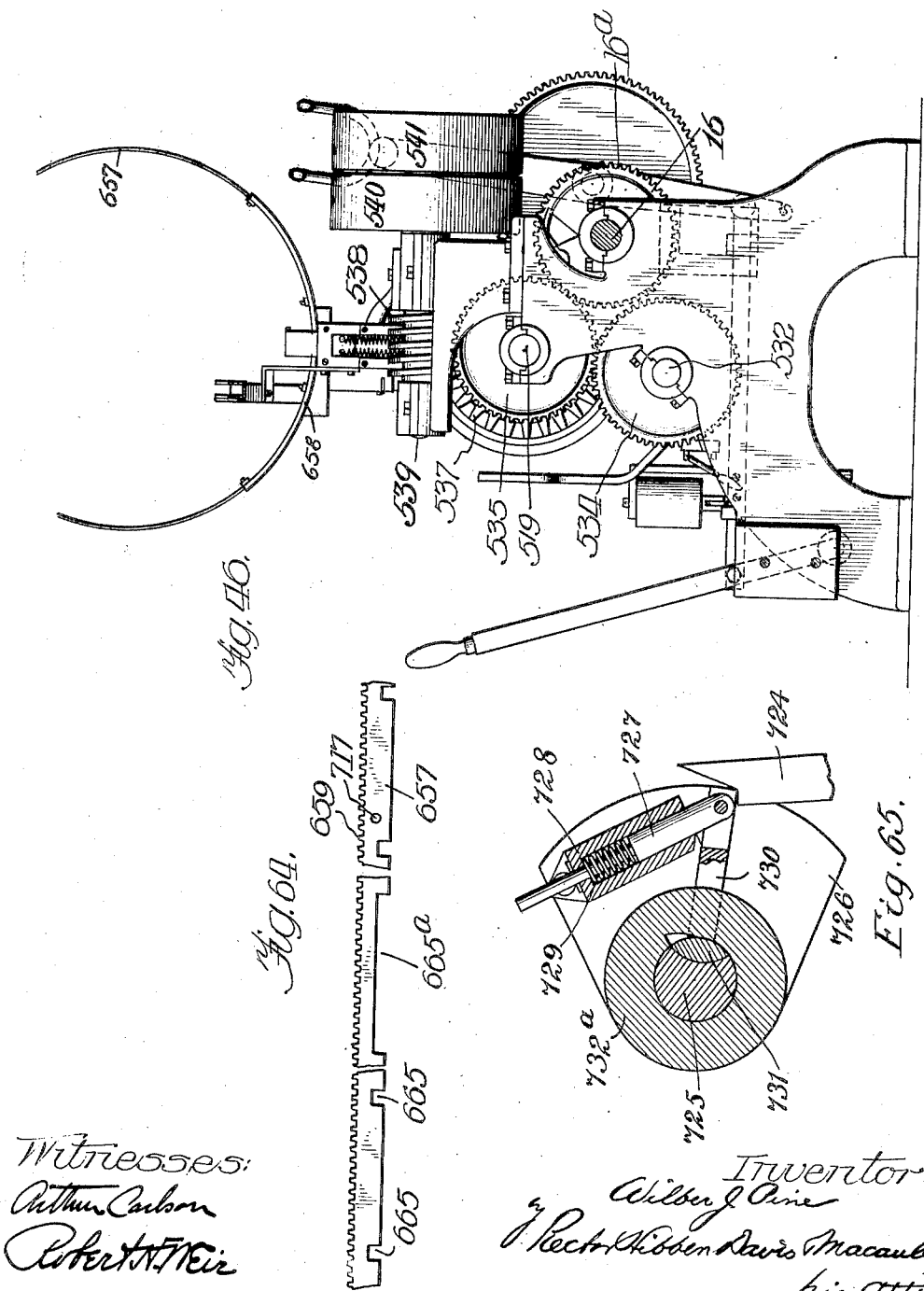

W. J. PINE.
MACHINE FOR MAKING WIRE FABRIC.
APPLICATION FILED AUG. 2, 1910.
1,068,075.
Patented July 22, 1913.
29 SHEETS—SHEET 25.
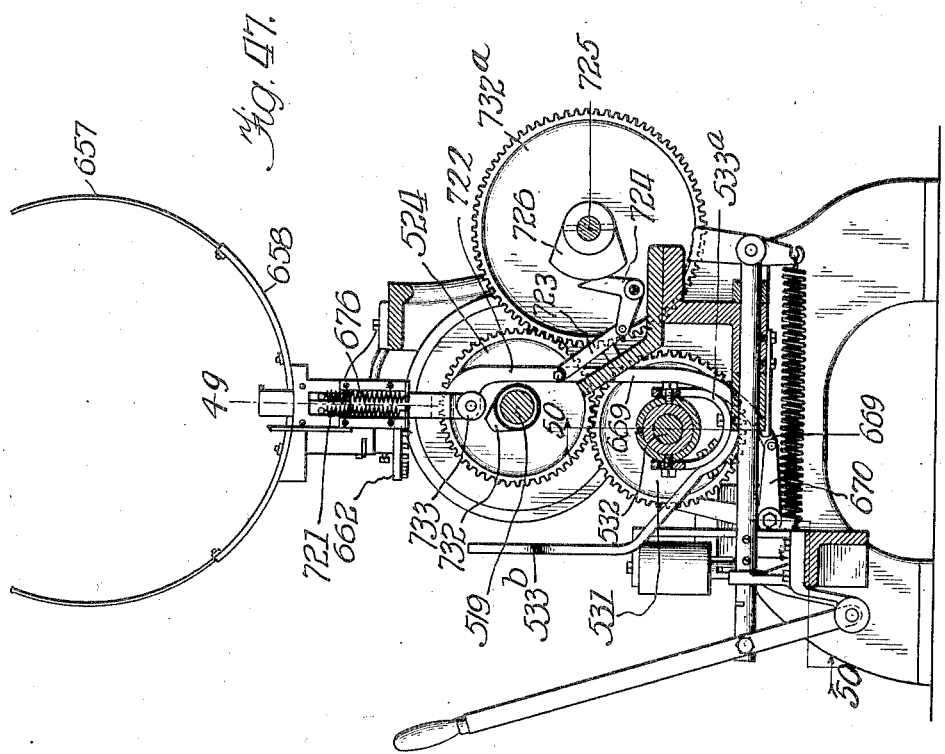
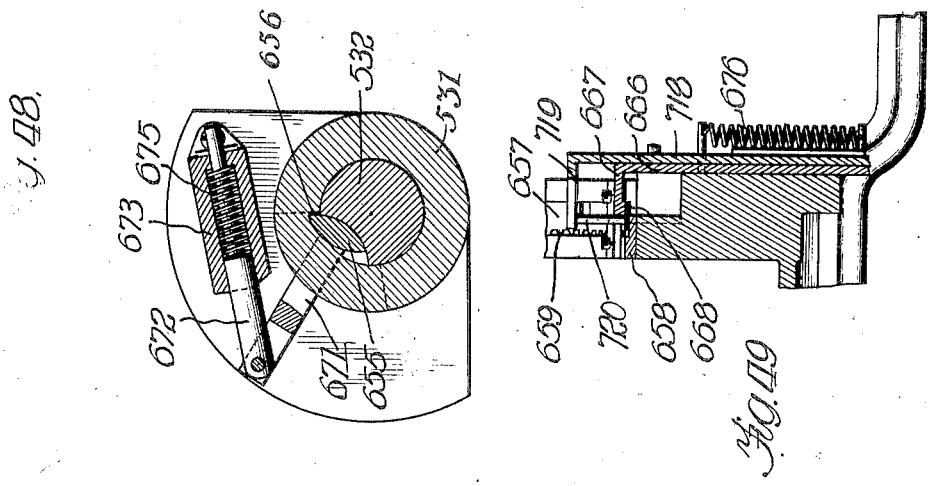
Witnesses:
Arthur Carlson
Robert H. Weir
Inventor
Wilber J. Pine
By Rector, Hibben, Davis & Macauley
Attys.

W. J. PINE.
MACHINE FOR MAKING WIRE FABRIC.
APPLICATION FILED AUG. 2, 1910.
1,068,075.
Patented July 22, 1913.
29 SHEETS—SHEET 26.
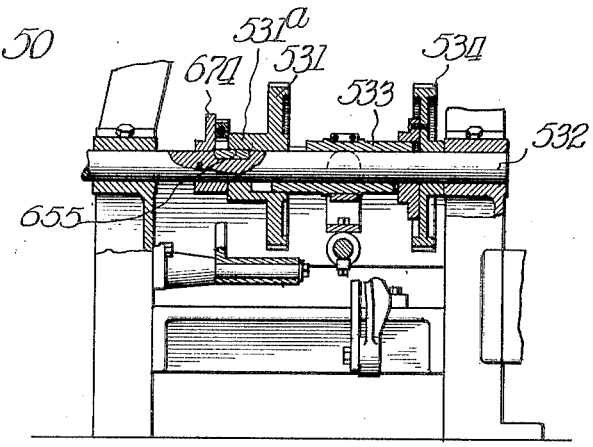
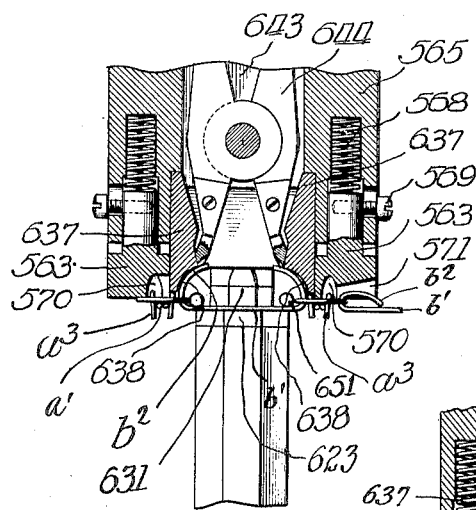
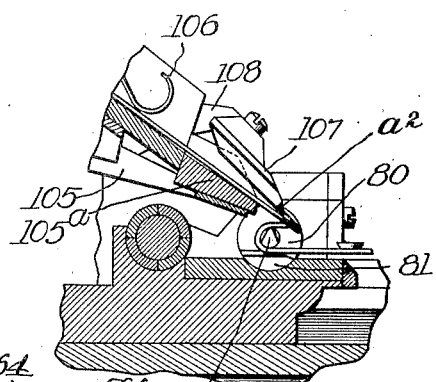
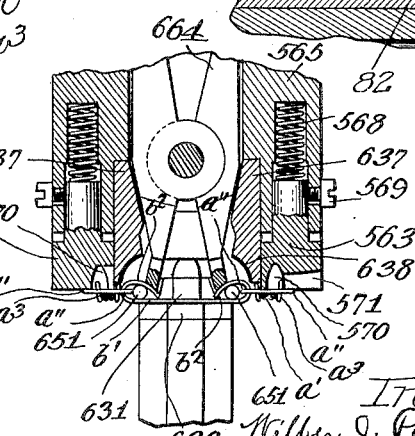
Witnesses:
Arthur Carlson
Robert N. Weir
Inventor
Wilbur J. Pine
By Rector, Hibben, Davis & Macauley
Attys.

W. J. PINE.
MACHINE FOR MAKING WIRE FABRIC.
APPLICATION FILED AUG. 2, 1910.
1,068,075.
Patented July 22, 1913.
29 SHEETS—SHEET 27.
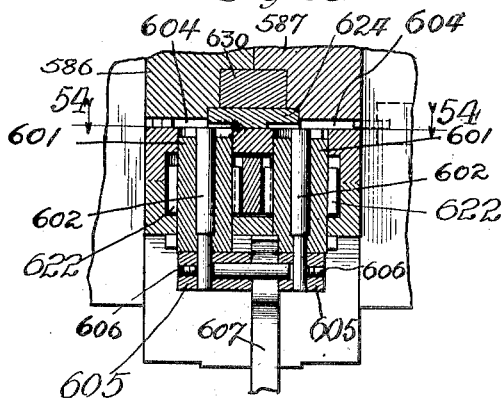
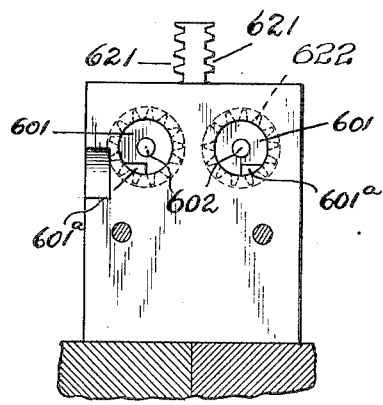
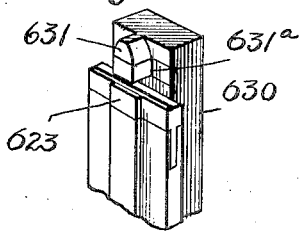
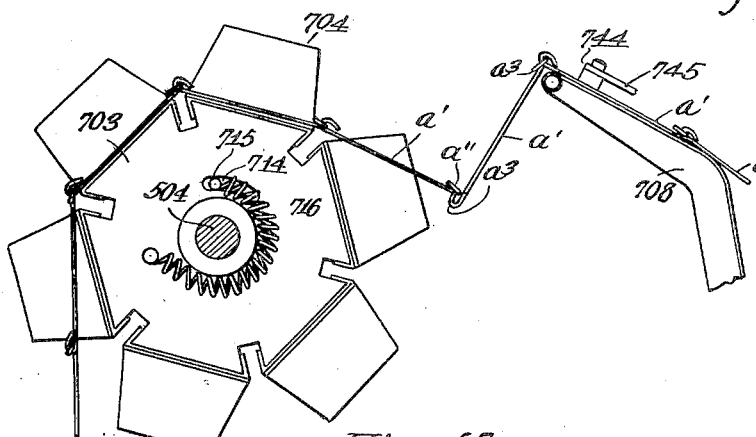

W. J. PINE.
MACHINE FOR MAKING WIRE FABRIC.
APPLICATION FILED AUG. 2, 1910.

1,068,075.

Patented July 22, 1913.
29 SHEETS—SHEET 28.

Witnesses:
Arthur Carlson
Robert H. Weir

Inventor
Wilber J. Pine
Rector Hibben Davis Macauley
Attys

W. J. PINE.
MACHINE FOR MAKING WIRE FABRIC.
APPLICATION FILED AUG. 2, 1910.

1,068,075.

Patented July 22, 1913.

29 SHEETS—SHEET 29.

Witnesses:
Arthur Carlson
Robert N. Weir

Inventor:
Wilber J. Pine

UNITED STATES PATENT OFFICE.

WILBER J. PINE, OF OSHKOSH, WISCONSIN, ASSIGNOR, BY MESNE ASSIGNMENTS, TO THE SIMMONS MANUFACTURING COMPANY, OF KENOSHA, WISCONSIN, A CORPORATION OF WISCONSIN.

MACHINE FOR MAKING WIRE FABRIC.

1,068,075.            Specification of Letters Patent.      Patented July 22, 1913.

Application filed August 2, 1910. Serial No. 575,175.

*To all whom it may concern:*

Be it known that I, WILBER J. PINE, a citizen of the United States, residing at Oshkosh, in the county of Winnebago and State of Wisconsin, have invented certain new and useful Improvements in Machines for Making Wire Fabric, of which the following is a specification.

The principal object of the invention is to automatically assemble the chain and cross links of wire fabric such as used for bed bottoms.

Fabric of the character concerned with this invention ordinarily comprises longitudinal strands of chain and transverse connecting cross links, the links composing the longitudinal strands of chain having eyes at their points of union (one eye to a link or two eyes) which eyes are adapted to receive the cross links. Chain for the longitudinal strands or lengths of the fabric has heretofore been automatically produced by continuous process and so have cross links for uniting lengths of the chain, and assembling of lengths of chain and cross links has also been done automatically, but so far as I am aware there has been no completely automatic machine for doing the entire work of making chain and cross links and also assembling the same.

By the present invention the production of completed fabric is rendered entirely automatic, the invention extending to automatic coördinated processes whereby the machine initially supplies itself with plain wire drawn from reels and ultimately delivers completed fabrics one after another indefinitely.

Now it is to be understood at the outset that the invention is not necessarily limited to the employment of chain links of any one special form for it may be adapted to varying forms of chain links such as now upon the market or to modifications thereof. However, the machine herein disclosed as a typical embodiment of my invention, is especially adapted for the production of fabric such as illustrated in patent to Richardson No. 865,799, issued September 10, 1907, and embraces mechanism for automatically forming and uniting chain-links of the character therein disclosed and for applying the connecting cross links to the double eyes or loops of these chain links. Neither is the invention to be understood as necessarily limited to the conjoint use of all of the various steps or automatic processes embraced within the development of the invention herein disclosed. For example, so much of the invention as pertains particularly to the assembling of lengths or strands of chain and connecting cross links in the novel manner hereinafter described, is not necessarily dependent upon the presence of mechanism for forming the links,—either those comprising the chain or the cross links,—as a part of the organized structure. At the same time the invention does extend to a combination of chain-making and fabric-assembling mechanisms broadly, since the chain-making mechanism provides, in its treatment of the chain links, for measuring the dimension of the fabric as thereafter produced by the assembling mechanism; and the invention also extends to a combination of cross-link making and fabric-assembling mechanism broadly, since the cross-link making mechanism is so controlled as to measure the width of the fabric being assembled.

It is to be borne in mind that the wire fabric which a machine of the present invention is designed to produce is necessarily of defined longitudinal dimension unlike the common wire fence fabric which is turned out in indefinite length,—a well known method of producing such fabric involving the running of parallel warp strands indefinitely. A bed bottom fabric is necessarily of limited length, not exceeding six feet and usually less, and therefore in the automatic production of such an article it is necessary to take into consideration the severance or disconnection at intervals measuring the length of the fabric as well as to define a uniform width. In connection with these requirements I regard the principa' problem to be solved as that of so disposing a continuous single chain of links as to provide the necessary parallel strands to form a bed bottom fabric of the requisite dimensions, and I have solved this problem by disposing the single chain spirally with convolutions spaced apart and link eyes of adjacent convolutions successively paired. A complete convolution of the chain measures the length of the fabric and its width is measured by a number of convolutions of chain united by cross links engaging the chain link eyes.

In order that the completed fabric may be automatically delivered flat, I provide, in the chain-making department of my machine for leaving hooks of a chain link unclosed at uniform intervals or distances measuring the length of the ultimate fabric, and these open links will aline transversely throughout the series of convolutions of chain in the spiral formation. I then provide for automatically disconnecting or unhooking the open links from the eyes of the links ahead with which they have been temporarily engaged in the formation of the chain, whereupon the completed fabric will be delivered flat. It will be understood, however, that there is not a necessary interdependence between this feature of automatically unhooking the fabric and the feature of spirally disposing the chain and applying the cross-links thereto, for of course the formation of the fabric by spirally disposing the chain and applying cross links thereto may be practised, leaving the unhooking to be done by hand. The complete automatic performance extending to unhooking and delivery of the fabric flat is of course preferable in the interests of economy in labor, which is the prime object of all automatic machinery. I merely wish it understood that my invention, while embracing conjoint employment of such features as the fabric-assembling and fabric-delivering, is not necessarily limited thereto. In fact the feature of automatically unhooking and delivering the fabric may be regarded as subordinate to that of assembling by spirally disposing the chain and applying the cross links thereto. As concerns determination of the lateral dimension of the fabric, this may be done most readily by suspending the supply or application of cross links between the final convolution of the chain which forms an outside longitudinal strand of a fabric and a following convolution which starts another fabric.

It will be understood from what has already been stated that in the typical embodiment of my invention hereinafter described in detail the cross links are formed from wire fed into the machine transversely to the chain in such manner as to provide for the threading of bent ends of the cross links into paired eyes of adjacent convolutions of the chain as the same is spirally disposed. By suspending the feed of such cross link wire after the formation and application of the final cross link of the fabric and during the formation of the following convolution of chain, necessarily the only connection between the completed fabric and the following one of which this next convolution forms the initial longitudinal strand, will be the separable one between the open hooks of the first link of the oncoming convolution, and the eyes of the final link of the last convolution of the completed fabric, and that therefore the disconnection or unhooking before described not only results in delivering the completed fabric flat, but also in disconnecting it from the following fabric.

In addition to suspending formation and application of cross links as above set forth, I also provide, in the machine hereinafter described, for suspending the application of a cross link to eyes of paired chain links in which open hooks are engaged, so that along the line where the fabric is to be unhooked there occur no cross links, it being desirable that at each end of the fabric there should be a series of chain links not connected together at their extremities.

Figure 2:
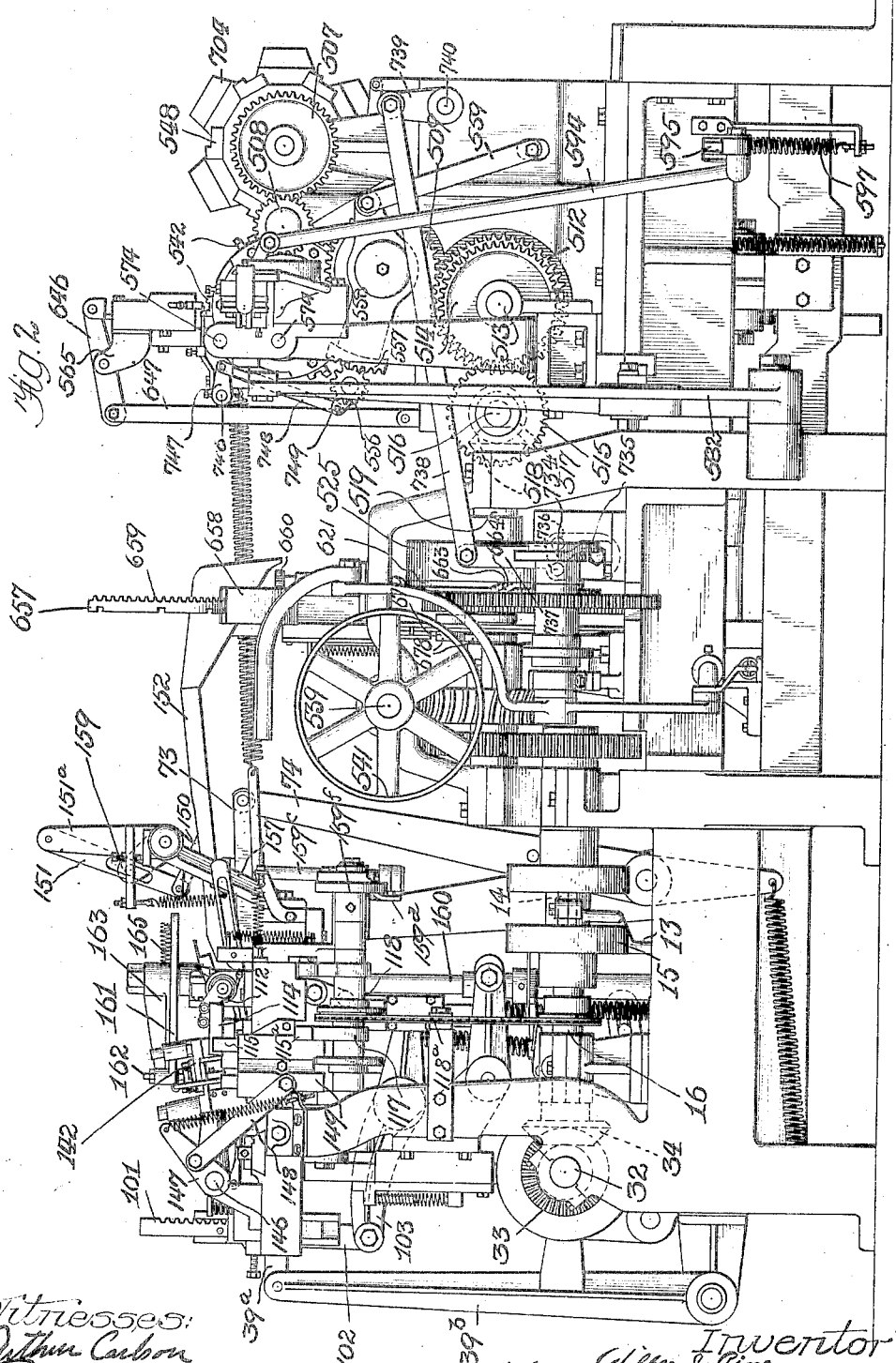
Figure 3:
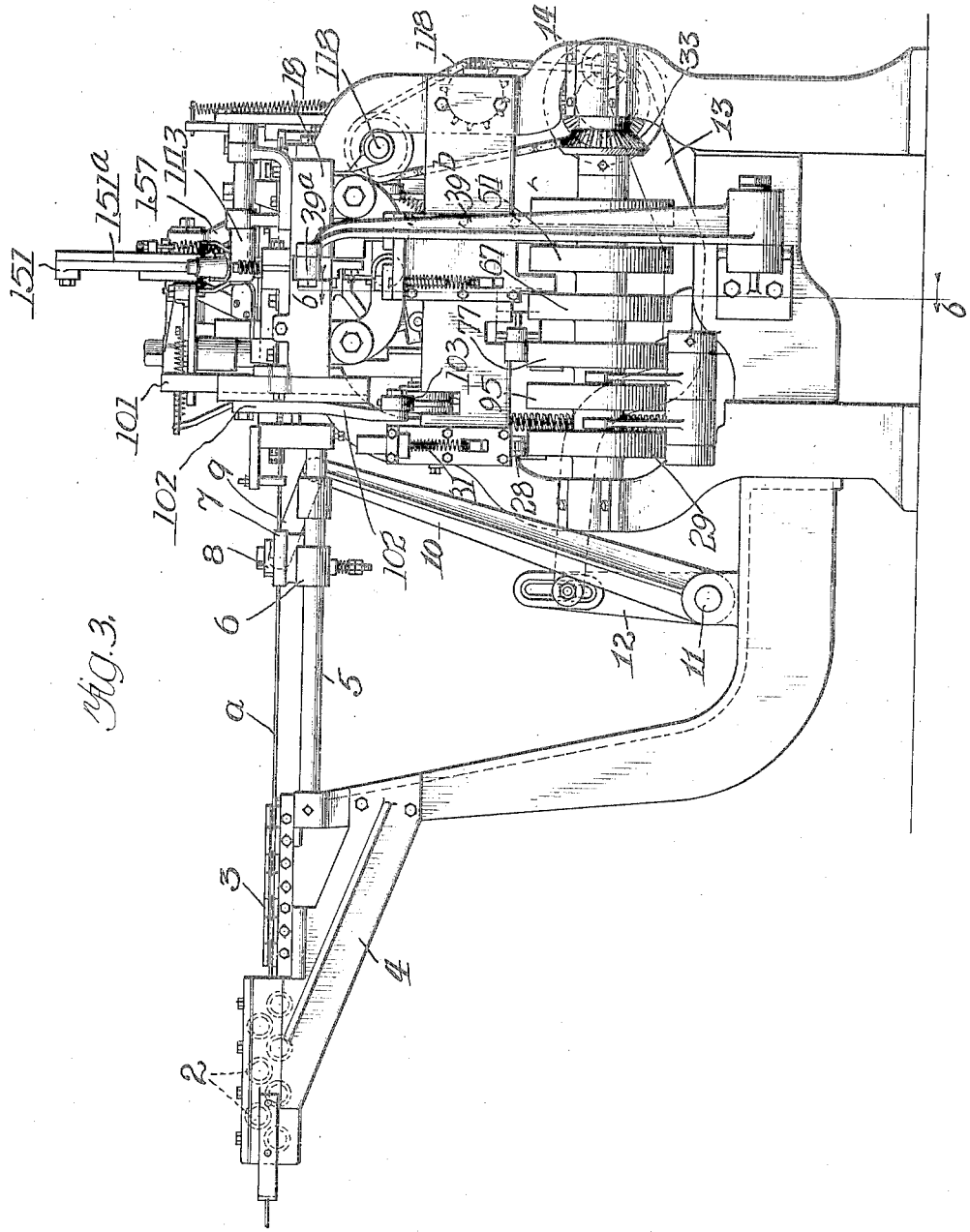
Figure 4:
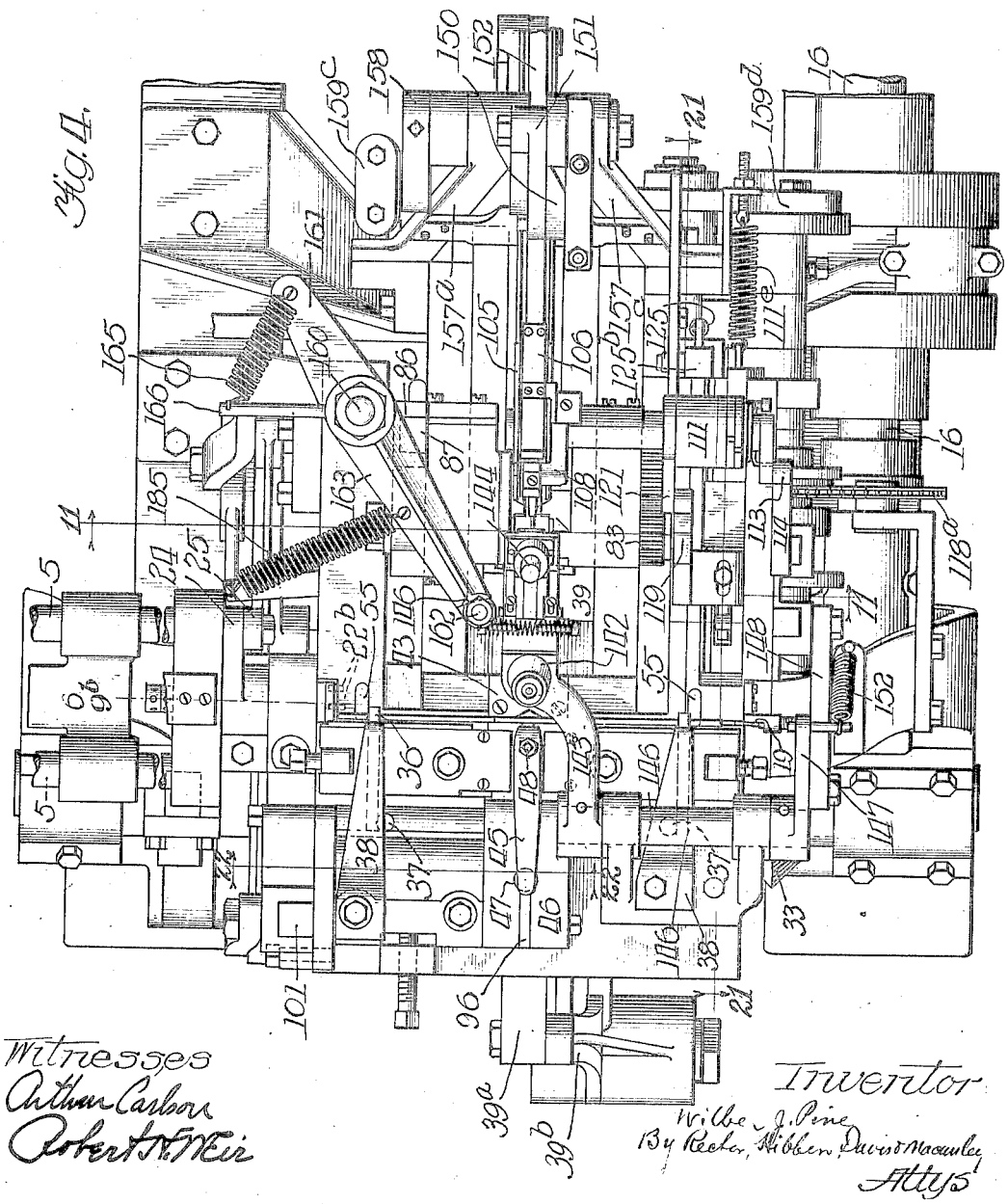
Figure 5:
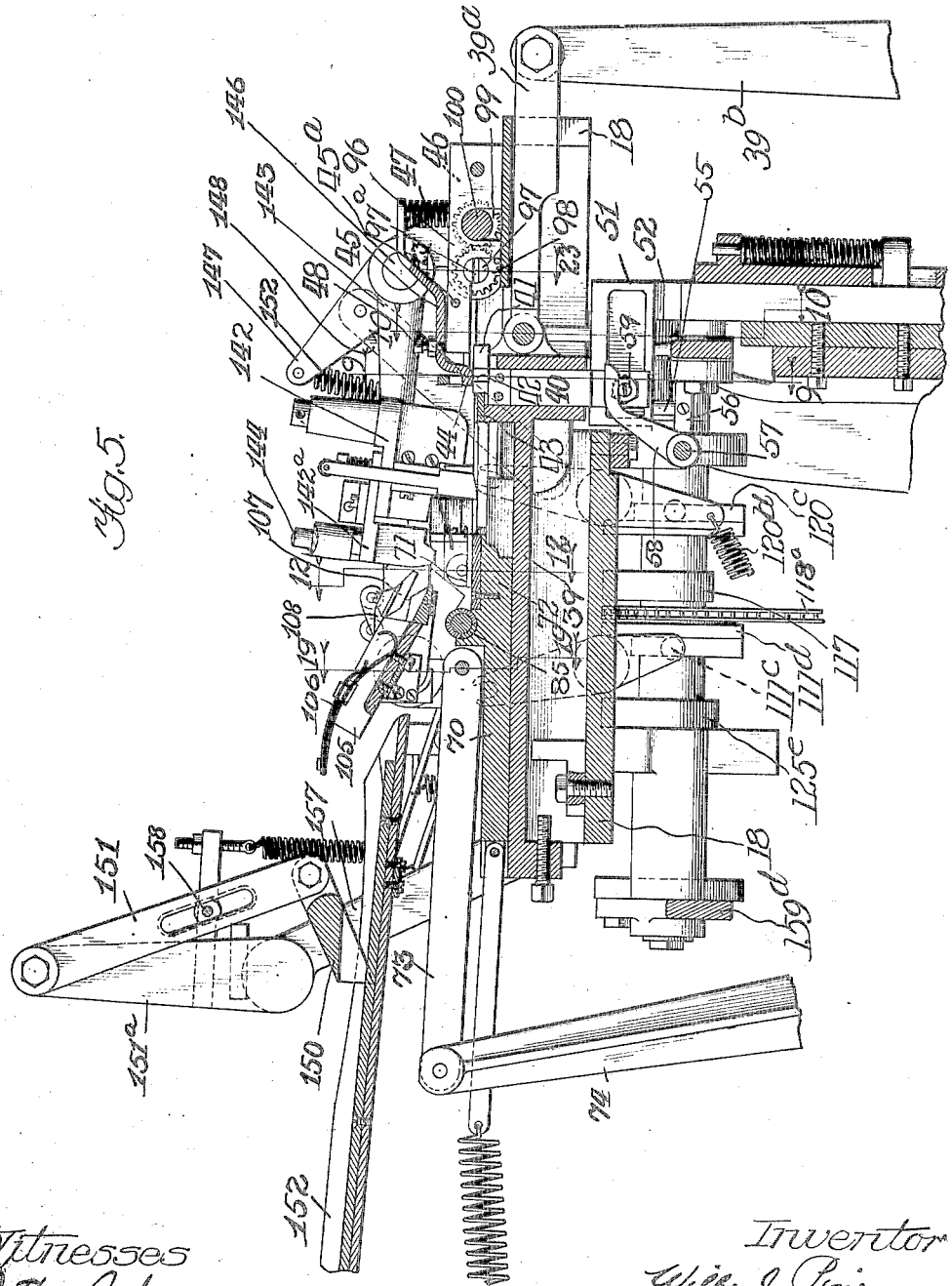
Figure 6:
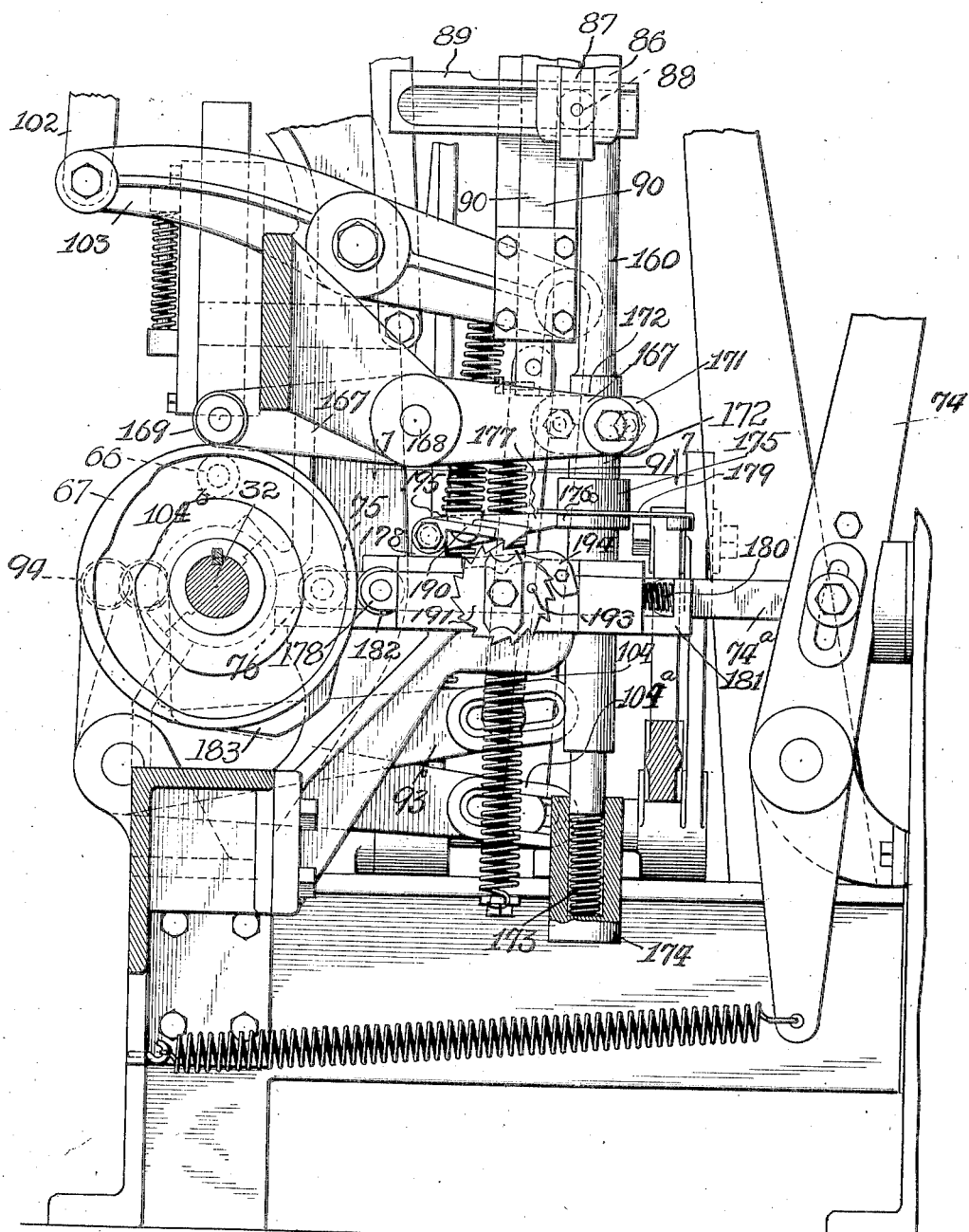
Figure 7:
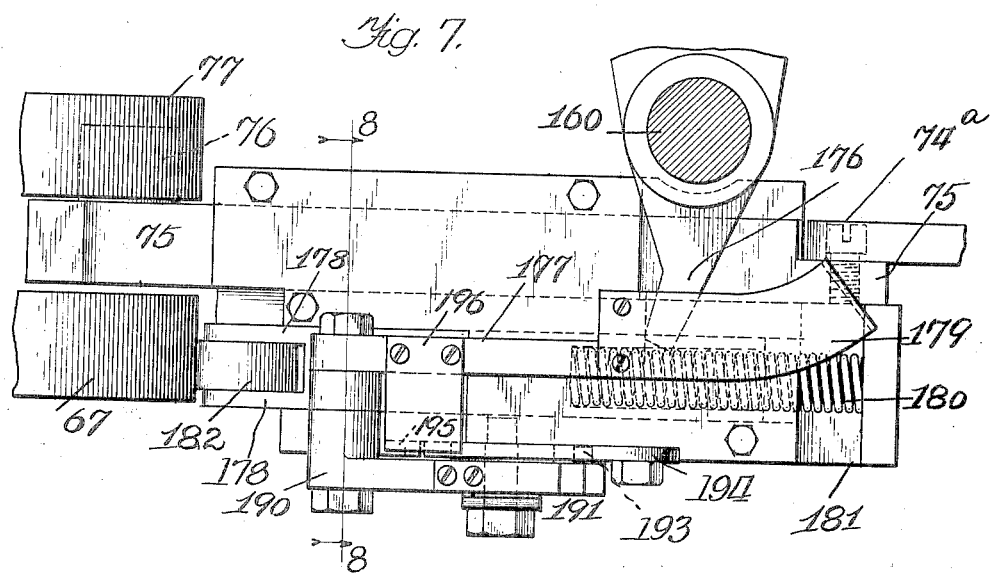
Figure 8:
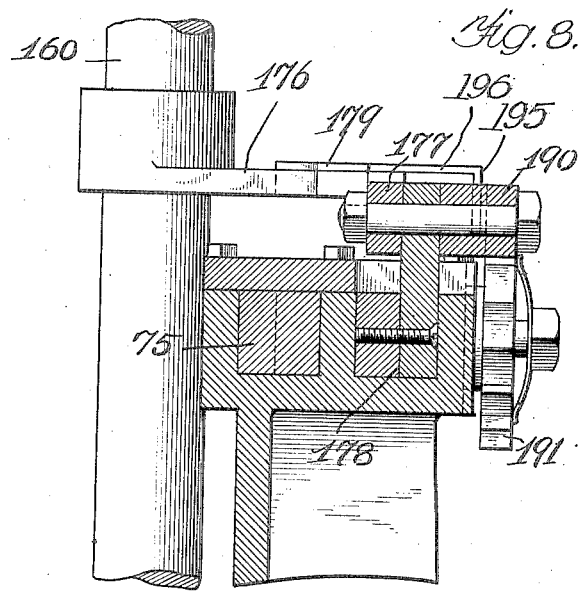
Figure 9:
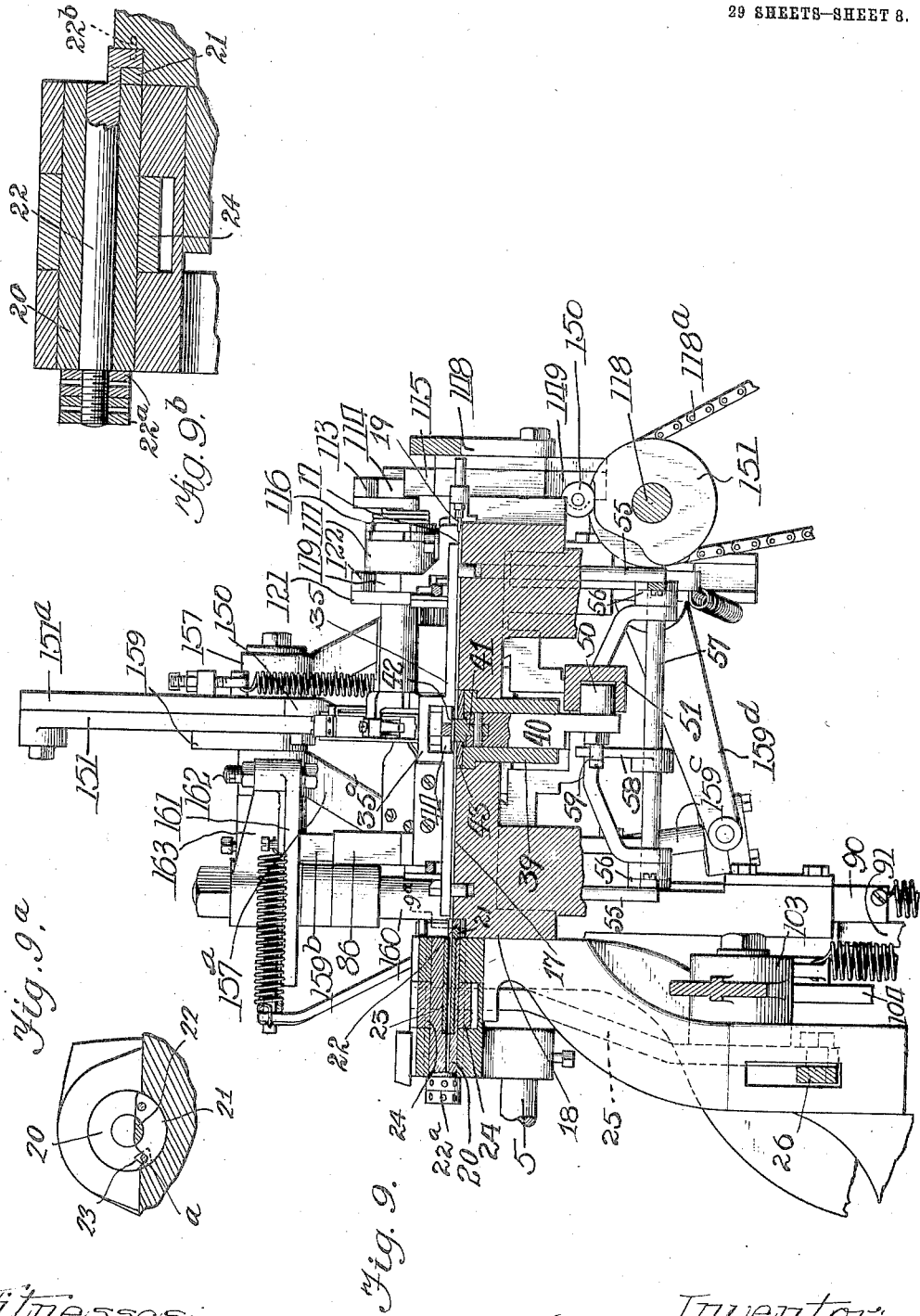
Figure 10:
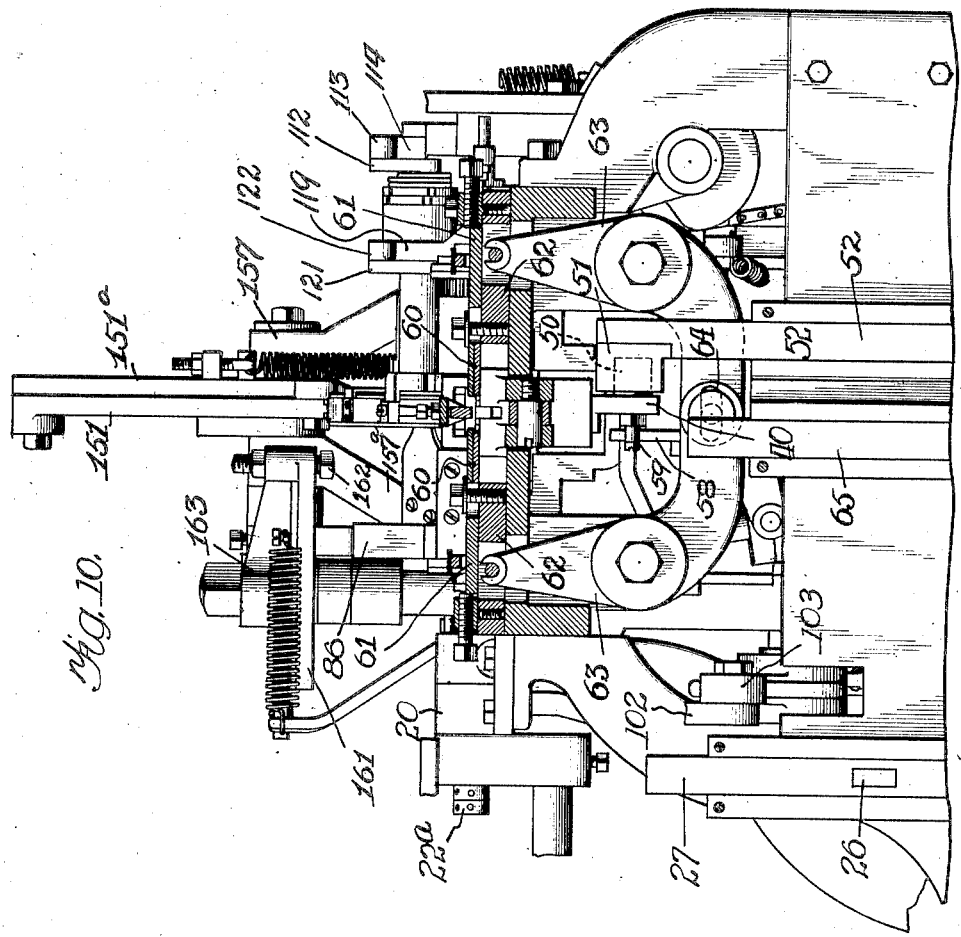
Figure 28:
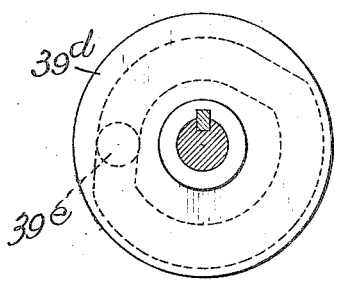
Figure 29:
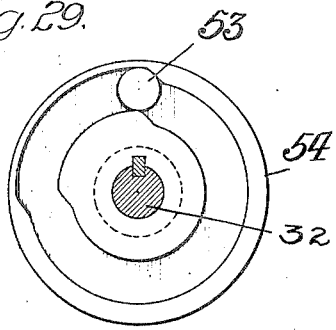
Figure 30:
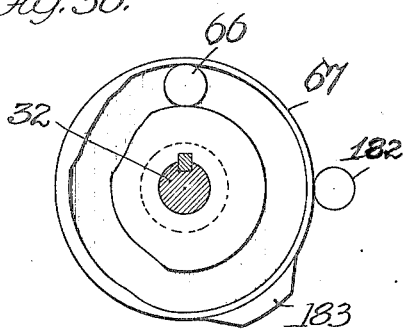
Figure 31:
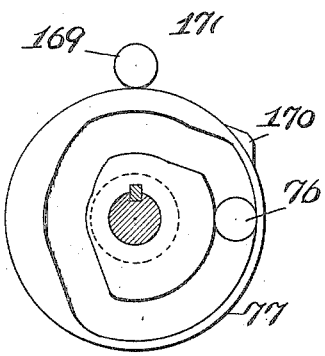
Figure 66:
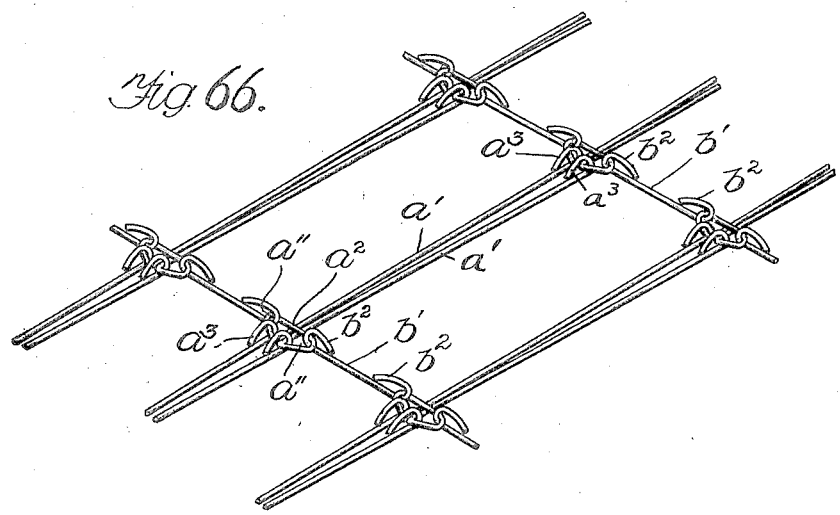
Figure 67:
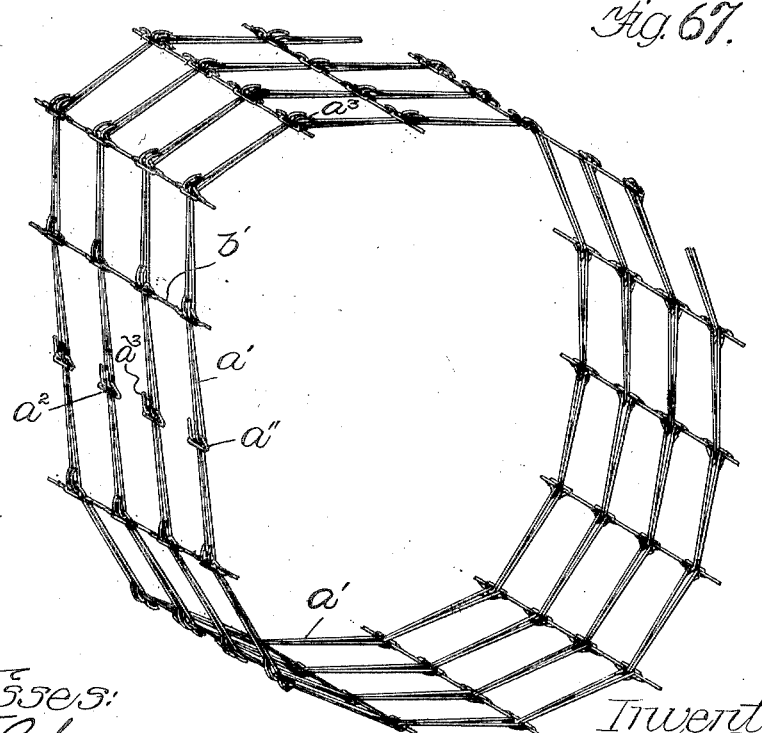

In the drawings which accompany and form part of this specification, Figure 1 represents an elevation of the complete machine from one side; Fig. 2 represents an elevation from the other side; Fig. 3 represents a front elevation of the machine; Fig. 4 a top plan view of the front portion of the machine; Fig. 5 a longitudinal vertical section of the front portion or chain making department of the machine; Fig. 6 a sectional elevation taken substantially on the line 6—6 of Fig. 3; Fig. 7 a horizontal section taken substantially on the line 7—7 of Fig. 6; Fig. 8 a cross-section on the line 8—8 of Fig. 7; Fig. 9 a cross-section on the line 9—9 of Fig. 5; Fig. 9$^a$ is a section on line 9$^a$ of Fig. 9; Fig. 9$^b$ is a section on line 9$^b$ of Fig. 4; Fig. 10 a cross-section on the line 10—10 of Fig. 5; Fig. 11 a cross-section on the line 11—11 of Fig. 4; Fig. 12 a cross-section on the line 12—12 of Fig. 5; Fig. 13 a section taken on the line 13—13 of Fig. 12; Figs. 14 and 15 vertical sections on the line 14—14 and 15—15 of Fig. 13; Figs. 16 to 18 detail perspective views of a number of parts; Fig. 18$^a$ is a detail plan view showing eye-forming mandrel and formers in operation; Fig. 19 a section taken substantially on the line 19—19 of Fig. 5; Fig. 20 an enlarged longitudinal section similar to a portion of Fig. 5; Fig. 20$^a$ is a sectional detail showing hook-forming mandrel and formers in operation; Fig. 21 a section taken substantially on the line 21—21 of Fig. 4; Fig. 22 a section taken substantially on the line 22—22 of Fig. 4; Fig. 22$^a$ is a sectional detail illustrating the eye-turning operation; Fig. 23 a section taken on the line 23—23 of Fig. 5; Fig. 24 a sectional view on an enlarged scale of a certain reciprocating head; Fig. 24$^a$ is a sectional detail illustrating the relation of parts for hook-closing; Figs. 25, 26 and 27 sections respectively on the lines 25—25, 26—26 and 27—27 of Fig. 24; Figs. 28 to 33 details of various cams in the chain-making portion of the machine; Fig. 34 is a rear elevation of the machine; Fig. 35 a top plan view of the rear portion or assembling department of the machine; Fig. 36 a sectional side elevation of the rear portion of the machine; Fig. 37 a vertical sectional view taken substantially on the line 37—37 of Fig. 36; Fig. 37ª is a detail sectional view taken on the line 37ª of Fig. 37; Fig. 38 a vertical section taken substantially on the line 38—38 of Fig. 36; Figs. 39 and 40 are sectional views at right angles to each other of certain safety clutch mechanism; Figs. 41 and 42 sectional details of certain intermittent driving mechanism; Fig. 43 a vertical section taken substantially on the line 43—43 of Fig. 35; Fig. 44 a sectional view of parts appearing in elevation at the upper portion of Fig. 37; Fig. 45 a cross-section on the line 45—45 of Fig. 44; Fig. 46 a sectional elevation taken substantially on the line 46—46 of Fig. 1; Fig. 47 is a vertical sectional elevation taken substantially on the line 47—47 of Fig. 1; Fig. 48 a sectional detail of certain clutch devices; Fig. 49 a vertical section on line 49 of Fig. 47; Fig. 50 a cross-section taken substantially on the line 50—50 of Fig. 47; Fig. 51 is a view similar to Fig. 44 with some additional parts and illustrating cross link hook-forming and uniting with chain links; Fig. 51ª is a similar view illustrating the further step of closing the cross link hooks; Fig. 52 is a sectional view similar to Fig. 20 but illustrating a changed relationship of parts which obtains when the eyes of a chain link are about to be engaged with the hooks of a following link; Fig. 53 a cross-section taken substantially on the line 53—53 of Fig. 36; Fig. 54 is a sectional elevation taken substantially on the line 54—54 of Fig. 53; Fig. 55 is a detail perspective view of certain cross link clamping jaws; Fig. 56 is a sectional detail of cross link mandrels and formers, including also an elevation of said clamping jaws and illustrating chain links positioned to receive the partially-formed cross link; Fig. 57 is a sectional view similar to Fig. 43 though not including all of the parts illustrated in the latter and also differing therefrom in showing a changed relationship of parts such as obtains when the fabric is being unhooked; Figs. 58 to 63 are details of various cams of the assembling department of the machine; Fig. 64 is an enlarged detail of a certain pattern band; Fig. 65 is a view similar to Fig. 48 of another and similar clutch device; Fig. 66 is a perspective view of a section of fabric which the machine is adapted to produce; and Fig. 67 is a perspective view of a section of fabric in the tubular form which it takes when ready for delivery from the machine.

*Chain link making.*—Referring first to Figs. 1, 2 and 3, the reference letter $a$ designates wire drawn from any suitable source of supply and out of which the links to compose the chain are formed. Said wire passes between series of vertically disposed guiding and straightening sheaves 2 and series of horizontally arranged similar sheaves 3, these and the sheaves 2 being suitably mounted upon a bracket 4 of the stationary frame work of the machine. Guide rods 5 extend from this bracket to an upper portion of the main frame-work and upon these rods slides a feed cross head 6 having a horizontal flanged shelf 7 over which the wire passes. A feed dog 8 is pivoted above said shelf and connected by a link 9 to a lever 10, it being understood that the vibration of said lever effects the requisite feed of the wire. The lever is secured to a rock shaft 11 to which is fastened a slotted arm 12 and there is coupled to the latter a transversely extending link or pitman 13 of irregular contour connected at its opposite end to a wrist pin 14 on a disk 15 fastened to a driving shaft 16. The feeding mechanism just described is calculated to project into the machine a length of wire sufficient for forming a complete chain link. Such length of wire is fed in transversely of the machine to lie in a groove 17 in a bed plate 18, the end of the wire striking against a spring-held buffer 19 which insures the proper and uniform disposition of the length of wire, yielding to any thrust effect in the cutting off operation and then recovering. The length of wire is cut off by an oscillating cylindrical shell 20 working in connection with a stationary disk knife 21 which is secured to a head on the inner end of a rod 22 extending through the shell. The latter has a hole through which the wire passes and a hardened inset 23 correspondingly apertured and from which the wire projects past the knife 21. The latter is held up in close engagement with the shell by nuts 22ª on the rod 22, and is held stationary by pins 22ᵇ which project from a seat in the bed-plate 18 and engage holes in the head of the rod. The head and the knife are cut away as shown in Figs. 9, 9ª and 9ᵇ to allow for the end of the wire escaping in the further operation performed upon it. The shell 20 is oscillated through the medium of an arm 24 secured to it and connected by a link 25 to an arm 26 of a vertical slide bar 27 the latter having a roller 28 at its lower end running upon the periphery of the cam 29. The latter has a projection 30 adapted to act in proper time upon said roller and thereby effect a cut-off through the medium of the connections described, against the stress of the spring 31 applied to the slide 27. The cam 29 is secured to a shaft 32 which at one end carries a beveled gear 33 in mesh with a similar gear 34 on the drive shaft 16. When the wire $a$ is projected through the groove 17 it passes under a bar 35 overlying said groove, the purpose of which is to insure the correct initial disposition of the length of wire. Said bar is carried by a pair of arms 36 pivoted to posts 37 and depressed by flat springs 38 (see Fig. 4). The bar has a raised or frame-like portion 35ª at the middle to space it from the wire sufficiently to accommodate other devices which act upon the latter. A slide 39 extends longitudinally through the bed plate 18 centrally thereof and below the raised portion of the bar 35 and in this slide there is fitted a vertically movable mandrel body 40 having a head 41 with a cross groove 42 which normally alines with the groove 17 to receive the wire. Said head is preferably made separate from the body 40 and formed with a shank 41ª (Fig. 18), which fits a bifurcation of the body wherein it is secured by pins or rivets, as shown in Figs. 5 and 9. There is preferably set into the top of the slide 39 a steel plate 43 (Figs. 4 and 5) cut out for the protrusion therethrough of the mandrel head 41 and cross-grooved in alinement with the grooves 17 and 42. A shoe 44 projects into the framelike portion 35ª of the bar 35 overlying the mandrel head 41 to confine the wire therein, said shoe being on the forward end of a lever 45 which is pivoted at 45ª to a plate 96 (Fig. 5) in a frame-block 46. A compression spring 47 is arranged under the forward arm of said lever and an adjusting set screw 48 is provided in the rear arm of the lever, such spring tending to press the shoe down upon the mandrel and the screw serving to limit the action of the spring and preserve such relation between the shoe and the mandrel as may be requisite for temporarily confining the wire in the latter while at the same time not interfering with forward and backward movement of the same when the slide 39 reciprocates in the manner presently to be described, said screw preventing depression of the partially formed link by the shoe when its mandrel moves forward.

The length of wire having been disposed in the manner above explained the mandrel rises taking the wire with it out of the groove 17, the bar 35 being raised sufficiently to permit this. The lower end of the mandrel body 40 carries a roller 50 which occupies a horizontal groove in a cross head 51 of a vertical slide bar 52, thus providing for maintenance of engagement between the latter and the mandrel for vertical movement notwithstanding the slide 39 in which the mandrel is mounted moves longitudinally of the machine. The slide bar 52 is suitably guided in the framework and has a roller 53 occupying the groove of a box cam 54 secured to the shaft 32, the form of the cam groove and the setting of the cam on the shaft being such as to cause rising and falling of the mandrel at the proper times, as hereinafter explained.

It is preferable that the wire-confining bar 35 be positively elevated when the mandrel rises so that there will be no strain upon the wire tending to bend or displace it at this stage in the operation. To this end a pair of rods 55 (Figs. 5 and 21) are arranged to slide vertically through the bed plate 18, their upper rearwardly-turned end portions extending under the bar 35, and under the wire also, as shown in Figs. 9 and 21. At their lower ends these rods 55 are jointed to arms 56 secured to and projecting forwardly from a rock shaft 57 journaled in the framework and having an intermediate arm 58 secured to it. This arm 58 extends upwardly and forwardly and has a forwardly-turned end portion overlying a projection of the mandrel body 40, which projection in the present instance is a part of the screw 59 on which the roller 50 is journaled. It will be obvious that, under this arrangement, whenever the mandrel is raised by the cam 54 the arm 59 will be acted upon and the rods 55 elevated so that they positively lift the wire and the retaining bar 35. It results that the length of wire will be lifted without being subjected to any strain. The purpose of so raising the wire is to free it from the groove 17 preparatory to bending it rearwardly around the portion of the mandrel head in rear of the groove 42, such portion being generally triangular in outline. (See Fig. 18). The mandrel having risen with the wire detained in the groove thereof by the shoe 44, the next step is to advance the slide 39 so that the mandrel will carry the central portion of the wire past forming jaws which bend the wire around the mandrel and then move toward each other to complete the formation of an eye out of the middle portion of the wire, such eye conforming to the triangular portion of the mandrel, (see Fig. 18ª). The said jaws consist of hardened pieces 60 secured to the undersides of plates 61 which are adjustably mounted upon slides 62, as shown in Fig. 10, said slides working in guideways on the bed plate 18 and being connected respectively to levers 63. The latter have arms extending toward each other and united by a joint 64 connected to a vertically-movable slide bar 65 having a roller 66 occupying the groove of a box cam 67 on the shaft 32. The plates 61 extend slightly beyond the jaws 60 as shown in Fig. 10, so as to hold the wire down during the bending and the edges of the jaws are slightly grooved to further insure against displacement of the wire. The edges of the jaws are curving in outline from their rear sides forward to effect the desired wiping action on the wire at opposite sides of the mandrel, and have noses 68 for closely bending the wire around the mandrel and being cut back forwardly beyond said noses to allow for closing in on the mandrel. The normal relation between the latter and said jaws front and rear is such that upon forward movement of the mandrel after its elevation the wire will be carried past the noses 68, the latter then constituting stationary formers which bend the wire to the form of a staple. Then the jaws move toward each other to bend the wire in over the converging sides of the mandrel. The form of the cam groove 67 is such as to provide for divided movement of the jaws toward each other so that the sides of the staple will first be moved toward each other and then a slight dwell will occur while certain hook-forming devices presently to be described, advance under and over said ends. The continued movement toward each other of said jaws brings the staple sides nearer together, laying the wire closely against the converging rearwardly-extending sides of the mandrel throughout, producing an eye which conforms to the triangular outline of the mandrel as illustrated in Fig. 18$^a$, the reference letter $a^2$ designating the central portion of the length of wire which lies in the groove of the mandrel and constitutes one side of said eye. During the first part of this eye-forming operation the portions $a^1$ of the wire sweep over the steel plate 43, then eventually the extremities of the wire are carried under curved shoes 69 (Fig. 15) fastened to portions of a carriage 70 occupying a slide-way in the slide 39, and over inclined ends of a cross-piece 69$^a$ (Fig. 15) also fastened to said carriage insuring the guiding of the said extremities to the plane of the mandrel head. The ends of the wire are carried through grooves 69$^b$ and are brought up against a separator or spreader-fin 71 upstanding from a plate 72 set in the base portion of the carriage 70. Said carriage 70 is connected by a link 73 to a lever 74, the latter being coupled by a link 74$^a$ to a slide 75 which carries a roller 76 occupying the groove of a box cam 77 of the shaft 32. The formation of the cam groove is such as to provide for controlling the movement of the carriage so as to cause a short advance sufficient to bring hook-forming devices on the carriage into proper relation with the wire, and then after the hook-forming has been accomplished to effect further and more extended advance of the carriage, thereby moving the whole link forward and engaging the eye at the forward end thereof with devices which operate to double back this eye, laying the transverse middle portion of the wire back over the parallel stretches of the link thereby producing the double eye formation.

The hook-forming devices comprise a pair of oscillating shafts 80 journaled in confronting portions of the carriage 70 and having segmental forming-blocks 81 on their faces and projecting into the space between the bearing portions of the carriage, as shown in Fig. 12. Through the centers of these shafts extend mandrels 82 in the form of round rods which normally protrude toward each other from the confronting faces of the shafts and over the former blocks 81. When the carriage 70 advances at first a comparatively short distance, the former blocks are carried under the end portions of the wire respectively and the mandrels 82 over the same. The carriage then dwells long enough to provide for rocking of the shafts 80 to bend the wire up behind and partly around the mandrels, thereby forming hooks but leaving them open, as illustrated in Fig. 20$^a$, the rotary movement of the shafts 80 being limited so that the former blocks 81 are given a substantially half revolution. The end portions of the wire having been bent around the mandrels forming hooks with extremities substantially parallel to or flaring with relation to the body portions or lengthwise stretches of the link, the shafts 80 are reversely rotated so as to take the former blocks 81 directly behind the hooks, as illustrated in Fig. 22, said blocks then serving as drivers to advance the link when the carriage 70 resumes its forward motion.

Figure 32:
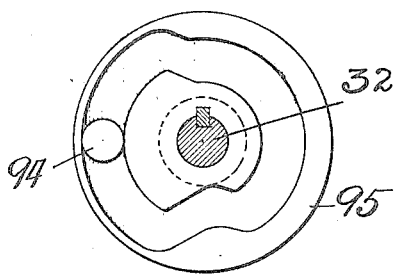

The shafts 80 have gears 83 in mesh respectively with gears 84 on a tubular sectional shaft 85 journaled in the carriage 70. The latter has a vertical guideway 86 for a rack 87 in mesh with one of said gears 84. The lower end of the rack 87 carries a roller 88 occupying a groove extending lengthwise of a cross head 89 at the upper end of a slide bar 90, this connection providing for maintenance of engagement between said slide and the rack bar for vertical movement of the latter notwithstanding the carriage 70 moves lengthwise of the machine. Such slide bar 90 is coupled to a link or pitman 91 which is in turn coupled to one arm of a bell crank lever 93, the other arm of which carries a roller 94 occupying the groove of a box cam 95 secured to the shaft 32. The formation of the cam groove is such, as shown in Fig. 32, as to provide for divided movement of the former-shafts as above indicated, to-wit, first a half rotation thereof in one direction and then a quarter rotation backward. The hooks having been formed the mandrel 41 lowers so as to be entirely below the horizontal plane of the wire, freeing the latter for advance by the carriage 70.

The ensuing advance of the carriage 70 drives the link forward into the frame block 46 under the straight edge of a guide bar 96 set in said block centrally thereof, and the side portions of the triangular eye of the link are carried into diametrical grooves or slots 97ᵃ of confronting shafts 97 journaled in said frame block. This triangular eye of the link passes to the forward ends of said grooves or slots and brings up against or in close proximity to a curved edge of the bar 96, extending on the arc of a circle corresponding with that of the peripheries of the shafts 97.

Figure 33:
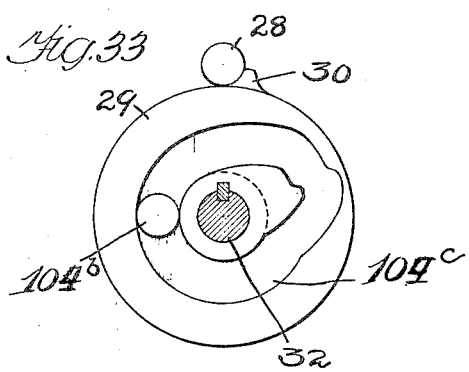
Figure 58:
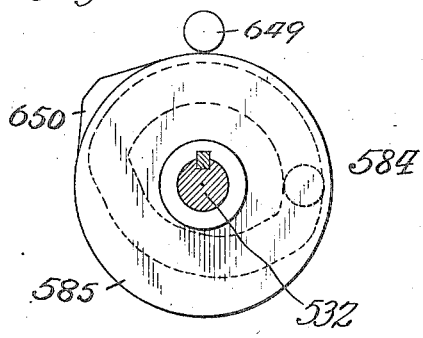
Figure 59:
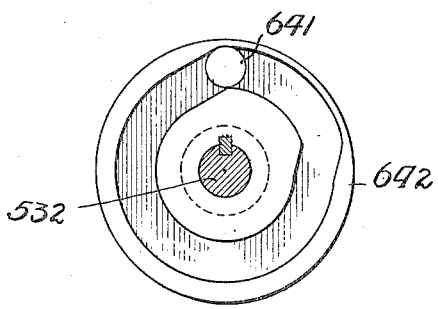
Figure 60:
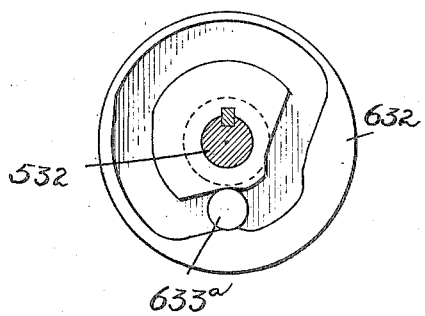
Figure 61:
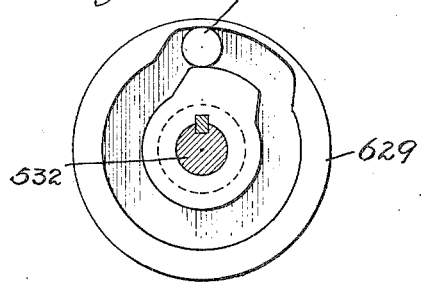

The triangular link eye having been thus disposed in the grooves of the shaft 97 the next step is to turn the latter substantially a half rotation in a direction to double the eye back upon itself, guided by the curving edge of the bar 96, as illustrated in Fig. 22ᵃ, the link being still backed up by the former blocks 81, though it will be understood that as the slotted shafts 97 start to double over the eye of the link the tendency will be rather to draw the link forward. This doubling over of the triangular eye forms two eyes $a''$ at opposite sides of the lengthwise portions $a'$ of the link. (See Fig. 66.) These eye-doubling shafts 97 carry gears 98 which are in mesh with gears 99 on a shaft 100 journaled in the block 46 and carrying another gear 100ᵃ on its outer end in mesh with a rack 101 sliding vertically through a suitable guideway adjacent the block 46, as shown in Fig. 4. A link 102 connects said rack with a lever 103 pivoted intermediate its length and at its rear end coupled to a link or pitman 104, the latter in turn coupled to one arm of a bell crank lever 104ᵃ, the other arm of which lever carries a roller 104ᵇ occupying a groove 104ᶜ in the cam 29 on the shaft 32. The formation of the groove is such, as shown in Fig. 33, that the eye-doubling shafts will first be given a substantially half rotation for the purpose of doubling the eye upon itself, and then will be slightly moved in the reverse direction to relieve the pressure upon the wire and provide for the doubled eye being freely withdrawn, it being understood of course that said half rotation of the shafts brings the forming grooves into substantially the same horizontal plane that they were when the operation commenced. The first turning of the shafts 97 may be slightly in excess of a half rotation so that the slight reverse movement will bring the grooves in exactly the same plane they were in the beginning, though this is not essential, it being sufficient that the grooves be brought substantially horizontal and the pressure relieved so that the link may be readily withdrawn. The withdrawal is accomplished by rearward movement of the carriage 70, it being understood that the mandrels 82 have remained in the hooks of the link so that they now constitute means for positively drawing the link rearward, and it may be added that these mandrels still remain in the hooks of the link while a previously-formed link is moved forward and dropped down to bring its eyes over the ends of the hooks. Then the mandrels withdraw to permit the eyes of this previously-formed link to be fully engaged with the hooks or seated therein and the hooks closed.

The slide 39 has meantime moved rearward to normal ready for the next length of wire to form a new link. Said slide is reciprocated through the medium of a link 39ᵃ connecting it to a lever 39ᵇ.

*Uniting the chain links.*—Of course in initially starting the machine it will be necessary to do some manipulating in order to get a chain of links started, especially as under the construction here shown the feeding of the chain rearward is done by application to the link made in the third previous cycle of operation of the machine. Assuming then that a sufficient number of links have been hooked together to reach the feeding mechanism, either by taking links and hooking them together by hand and putting them in the machine or by running the machine to form links and placing the first link by hand in the proper position to unite with the next link formed and then advancing the two links by hand and forming a third and uniting that to the one ahead through the automatic operation of the machine, the link ahead of the one being formed lies in an inclined holder 105 in the form of a trough in which is mounted a flat spring 106 adapted to bear upon the link and prevent its accidental displacement when not clamped by a vise jaw (hereinafter described) which is adapted to automatically and securely clamp the link back of its eyes so as to insure the proper disposition of these eyes for the threading therethrough of the hooks of the next link. The proper disposition of the link in the trough 105 is with its eye portion projecting beyond the forward end of the trough, as illustrated in Fig. 52. The forward part of the trough or holder is in the form of a jaw 105ᵃ with an inclined bottom surface and upwardly projecting sides and the above mentioned vise-jaw designated 107 extends above this forward portion of the trough and is secured to an arm 108 which is integral with a shaft 109 running through a tubular shaft 110 on the inner end of which is secured said holder 105. This is here shown accomplished by fastening a half sleeve 105ᵇ to the shaft and securing a bracket 105ᶜ to the sleeve, said bracket supplying a rest for the holder which is screwed to it. Another bracket 105ᵈ secured to the sleeve serves as a support for the spring 106, and a forwardly projecting arm 105ᵉ integral with the shaft 110 supports the jaw 105ᵃ which is screwed to it. The shaft 110 is journaled in a head 111 adjustably fastened to a slide 111ᵃ movable horizontally on the frame of the machine so that the holder and vise jaw may move bodily in a forward direction for the purpose of carrying the link forward, it being understood that before such bodily movement the inner shaft 109 has rocked to carry the vise jaw 107 between the sides of the jaw 105$^a$ and upon the link just back of the eye portion $a^2$ (Fig. 52) so as to back up the same and effect positive forward movement thereof and also definitely position it in the holder. The vise jaw is operated by means of an arm 112 secured to the outer end of its shaft 109 and carrying a roller 113 engaged with the upper extended edge of a cross head 114 on a vertical slide bar 115. A spring 116 fastened to said arm 112 and to a screw 116$^a$ in slide head 111 tends to close the vise jaw, and a cam 117 on a shaft 118 operates the slide 115 in opposition to the spring, said slide 115 having a roller 115$^a$ engaging said cam. The said shaft 118 is connected with shaft 16 by sprocket wheels and chain 118$^a$.

It will be understood that the vise jaw having closed and the next link having been formed, the hooks thereof are around the mandrels 82 with ends projecting forward therefrom as shown in Fig. 52, and it is provided that movement of the slide 111$^a$ and the holder 105 shall be such as to bring the eyes of the link in the holder directly in front of the extremities of the hooks as shown in Fig. 52. This is accomplished by forward movement of the slide and slight downward tilting of the holder, then further tilting of the latter engages the eyes with the hooks. The rocking of the shaft 110 to tilt the holder is effected by the spring 116 under the guidance of a cam 119 adjustably mounted on a secondary slide 120, the shaft having an arm 121 secured to it and carrying a roller 122 to ride upon said cam. Normally the roller is on the straight top edge of the cam but when the slide 111$^a$ has moved a short distance forward the roller runs onto the cam incline, so that the holder tilts slightly as above described. Then said slide dwells and the slide 120 moves rearward, carrying a further and somewhat sharper inclined edge of the cam under the roller 122 so that the holder is tilted to engage the eyes with the hooks. The two slides 111$^a$ and 120 are operated respectively by levers 111$^b$ and 120$^a$ pivoted intermediate their ends upon the framework and bifurcated at their upper ends and having rollers 111$^c$ and 120$^b$ on their depending arms held against cams 111$^d$ and 120$^c$ by springs 111$^e$ and 120$^d$ (spring 111$^e$ being fastened to the slide 111$^a$), said cams being secured to the shaft 118 and being of such formation as to provide for the relative movements of the slides as above described. The mandrels 82 then withdraw from the hooks and the two slides 111$^a$ and 120 move rearward together so that the eyes of the link in the holder 105 will be carried back and fully engaged with the hooks as shown in Fig. 24$^a$, by movement in a horizontal plane, the formation of said cams also providing for this simultaneous movement of slides. The withdrawal of the mandrels is effected by a pair of arms or blades 123 acting upon heads 124 on the mandrels at their outer ends and having lateral interior cam formations for said blades to act upon, the mandrels being impelled toward each other by springs 125 as shown in Fig. 12. The blades are integral with members of a sectional shaft 123$^a$ journaled in the tubular shaft 85. A lever 125 is secured in said shaft and slotted longitudinally to allow for the movement of the carriage 70 and yet preserve effective engagement with operating devices. The latter comprise a roller 125$^a$ on a vertical slide 125$^b$ drawn downward by a spring 125$^c$ and having a roller 125$^d$ operated upon by a cam 125$^e$ secured to shaft 118; the outline of the cam being such that the blades will perform their function above described at the proper time.

*Closing link hooks, leaving certain of them open at regular intervals.*—It will be understood that the hooks of the links having been formed and the links united in the manner above described, the hooks are to be closed down over the eyes except at regular intervals where hooks should be left open for the purpose of measuring the length of the fabric. As the invention is here shown embodied the machine is arranged to turn out a fabric, the longitudinal strands of which each comprises fifteen links. Therefore the hooks of every fifteenth link will be left open for the purpose of eventually disconnecting for the delivery of a completed fabric.

Referring to Figs. 4 and 5, a head 142 carried by a pivoted arm 143 has pivotally mounted upon it and spring-held, a holder 142$^a$ in which there is mounted a hook-closing plunger 144 upheld by a spring 145, and grooved in its lower end to engage the hooks (Fig. 24$^a$). When said head is lowered the grooved end of said plunger is carried down upon the open hooks, and then the plunger is struck and forcibly driven downward by a hammer, (presently to be described), whereby the hooks are closed. Arm 143 is secured to a rock shaft 146 to which is fastened another arm 147 and the latter is connected by a link 148 to a slide 149 carrying a roller 150 engaging a cam 151 on shaft 118. A spring 152 fastened to the arm 147 tends to lower the head 142.

In order to compensate for the increasing angularity of the hooks $a^3$ as they are closed by the plunger 144 and maintain proper engagement between the plunger and the hooks, it is preferably arranged that when the plunger first strikes the hooks it will engage the same a distance back of their ends (as illustrated in Fig. 24ª) and then as the plunger descends it may slip toward these ends. This is the purpose of pivoting the holder 142ª under spring action as before mentioned. As here shown the pivot 142ᵇ engages a small bracket 142ᶜ (Figs. 16, 24 and 26) and a lug 142ᵈ which is secured to the head 142 and extends upwardly through the central open portion of the bracket. The latter has base flanges 142ᵉ with longitudinal slots 142ᶠ (Figs. 4 and 16) through which screws 142ᵍ (Figs. 4 and 26) extend adjustably fastening the bracket to a flat portion 142ʰ of the holder 142ª. This portion of the said holder overlies a somewhat similar portion of the head 142 and is slotted longitudinally to embrace a screw 142ⁱ (Fig. 24) between the head of which and said portion of the holder there is interposed a spring 142ʲ. Normally this spring keeps the portion 142ʰ of the holder down upon the head 142, as shown in Fig. 24, but as the plunger 144 closes the hooks said spring will yield permitting a slight rocking of the holder on its pivot 142ᵇ so that the acting portion of the plunger may travel toward the ends of the hooks.

Referring to Figs. 1 to 4 and 6 to 8 the reference numeral 160 designates a vertical staff which is mounted in suitable bearings upon the framework of the machine so as to be capable of both oscillating in a horizontal plane and moving up and down. At the top of this staff there is loosely mounted upon it a horizontally-extending arm 161 which carries at one end a bolt 162 adjustably secured in it, the head of which bolt serves as a hammer for closing the hooks over the eyes. Just above said arm 161 there is secured to the staff 160 another arm 163 which has a slightly oblique end edge 164 against which a portion of the bolt 162 is held by a spring 165 secured to the opposite end of the arm 161 and to a post 166 which is secured to the arm 163, as shown in Fig. 4. This particular mounting of the arm 161, in place of having it fixedly secured to the staff 160, is merely a safeguard to prevent injury or derangement should the arm 161 in swinging strike any portion of the head 142 or parts carried thereby. It will be understood that the staff 160 is oscillated so as to periodically swing the arm 161 inwardly and bring the hammer 162 into effective position above the plunger, whereupon the staff 160 is forced downward to cause said hammer to act upon the plunger and close the hooks over the eyes of the preceding link. The reciprocation of the staff for such purpose is effected through the medium of a lever 167 pivoted at 168 to a bracket of the framework and having a roller 169 running upon the periphery of the cam 77 which has a projection 170 to lift the roller. The lever at its opposite end is jointed to a split collar 171 loosely embracing the staff 160 under a shoulder 172 thereof. At its lower end the staff rests upon a compression spring 173 in a step bearing 174.

The oscillation of the staff 160 is effected through the following described means: A collar 175 is fastened to the staff and has a finger 176 adapted to be acted upon by a dog or pawl 177 which is pivoted to a slide 178, the end of said dog or pawl acting against a radial edge of the finger 176. A guard 179 secured to the dog or pawl 177 extends over the finger 176, as shown in Fig. 6, so as to preserve the proper relation between these parts. A compression spring 180 is arranged between an upright end portion of the guideway 181 for the slide 178 and a portion of said slide so as to retract the latter. The slide carries a roller 182 at the forward end running against the periphery of the cam 67 which has a projection 183 so that periodically the slide will be advanced and the dog or pawl 177 caused to operate upon the finger 176 and oscillate the staff 160. The latter will be returned to its normal position by a spring 185, Fig. 4, which connects the arm 163 with a fixed portion of the framework.

The non-closure of hooks of every fifteenth link is provided for by suspending the oscillation of the staff 160 so that the arms 163 and 161 remain in their outer position and vertical reciprocation of the staff 160 has no effect to drive the hammer 162 upon the plunger. To this end there is pivoted concentrically with the dog 177 a pawl 190 which rests by gravity upon a ratchet wheel 191 having fifteen teeth. With every reciprocation of the slide 178 the pawl 190 is carried back over a tooth of the ratchet wheel and then advances the latter one step. A pin 193 projects from one side of said ratchet wheel and is adapted at every fifteenth one-step turning of the ratchet wheel to act upon a finger 194 pivoted to the fixed guideway 181 and extending below a downturned lip 195 of a plate 196 fastened to the dog 177. The finger 194 normally maintains a lowered position by gravity but when the fifteenth or end link of a series has had a following or first link of another series coupled with it, the pin 193 lifts this finger and causes it to act upon the lip 195 and thereby lift the dog 177 carrying its end up above the plane of the finger 176 so that when the slide 178 is forced back by its cam said dog will miss said finger and the staff 160 will not be turned. Of course in this operation the ratchet wheel 191 is turned one step and the pin 193 carried on so that with the return of said slide the dog 177 will again resume its position in front of the finger 176 ready to operate upon the latter and turn the staff 160 so that the next pair of link hooks will be closed upon the eyes of the link ahead and so on until another set of fifteen links has been united.

In the hook-closing operation, the segmental forming blocks 81 constitute anvils on which the under parts of the hooks rest, and as there would be a tendency in the engagement between the upper part of the hooks and the plunger, to crowd the links forward, I provide a clamp 153 in the form of a head on a stem 154 which occupies a bore in the head 142 (Fig. 27). A spring 154$^a$ presses the stem down and the head on the latter is formed with a shoulder 155 to engage behind the transverse portion of the eye-formation on the link to resist any tendency of the latter to move rearward. Owing to the arc movement of the head 142 said shoulder also assists in hooking the links together since it moves the link it engages, slightly forward at a time when the other link is moving rearward.

It will be understood that the two slides 111$^a$ and 120 having moved rearward together the slide 120 is then moved forward to normal position whereby the holder 105 is tilted upward, lifting the just-coupled links. Thereupon the vise jaw 107 opens and the links of said chain are fed rearward so that the eyes of the link just lifted will be brought just forward of the holder ready to be applied to the next link which is already in process of formation.

The lifting of the coupled links is not effected entirely by the tilting of the holder 105 but a special lifter is provided which takes hold of the middle portion of the oncoming link. Said lifter takes the form of tongs whose two members 141 are pivoted to the head 142. A spring 144$^a$ tends to close together the acting portions of the tongs and the latter have inclined lower faces 145 so that when the head 142 is lowered and these inclined faces strike the sides of the link the tongs will open, the spring 144$^a$ yielding, and then, after having passed by the link, will close under the same so that when the head 142 rises the tongs will lift the link at the same time permitting it to slide through in a rearward direction when the feed mechanism acts. A flat spring 156 is preferably fastened to the underside of the head 142 to bear on the links so that they will not become displaced. The above described lifting of the last formed link by engaging its middle portion is important because of the necessity for getting it quickly out of the way of the newly-forming link.

The feed mechanism is in the form of a gravity dog 150 pivoted to the lower end of an operating arm 151 and traveling back and forth in a runway 152 through which the chain passes. The arm 151 is pivoted to a standard 151$^a$ adjustable on a frame-bracket 157 and said arm 151 is slotted to receive a stud 158 which couples it to a crank arm 159 of a rock shaft 159$^a$ journaled in companion frame-bracket 157$^a$. An operating arm 159$^b$ on said rock shaft is connected by a pitman 159$^c$ with a lever 159$^d$ slotted to embrace a crank pin 159$^e$ on a disk 159$^f$ secured to the shaft 118.

*Assembling the fabric.*—The chain links having been formed and united in the manner above described and the chain intermittently advanced, the next thing is to dispose it in lengths of uniform extent and connect a predetermined number of such lengths of chain, for the purpose of assembling a complete fabric of the desired dimensions. I have already explained that at regular intervals chain link hooks are left open,—in the particular embodiment of the invention here disclosed the hooks of every fifteenth link thereby providing for chain lengths each composed of fifteen links. As indicated at the outset of this specification the endless chain of links is disposed spirally for the purpose of paralleling the requisite number of lengths of chain and connecting them together by cross links. In practice when the machine has been set up and made ready for operation, the chain-making department will be operated independently until sufficient chain has been produced to provide for laying a single convolution by hand. Then the continued laying of convolutions or spiral disposing of the chain takes place automatically in conjunction with the automatic feed of wire for the cross links and the formation and application of cross links to connect paired eyes of the chain links. Having once been started the machine will run indefinitely, turning off fabric after fabric and of course the starting up of the machine after having been stopped does not involve a repetition of the hand-laying of an initial convolution of chain because of course whenever the machine was stopped its operation up to that point would leave the chain properly disposed for resumption of the fabric assembling. In fact with a construction such as presently to be described in detail, several convolutions of the next fabric have been laid and united when the completed fabric is delivered so that when the machine stops at the end of a run there would always be a considerable portion of a fabric formed and with the resumption of operation the formation of that fabric would simply be continued where it had been left off.

A loop will preferably be maintained in the chain where it passes from the chain-making to the fabric-assembling department of the machine as shown in Fig. 1, so that dependence need not be placed upon any exact synchrony between the intermittent chain delivery hereinbefore described and the intermittent advance of the chain in spirally disposing the same as presently to be described.

In a portion of the fixed frame work designated by the numeral 500 there are journaled horizontally a pair of drums 501 and 502 (Fig. 37) having flanged heads confronting each other and spaced apart approximately the length of a cross link of the fabric or the distance between chain lengths thereof.

The oncoming chain is laid over the top of the flanged head of the drum 501, thence passing rearward over the top of the alined division of double drum 503 which is secured to a shaft 504 journaled in the frame-piece 500 (Fig. 33). The chain hangs in a loop from the rear side of said drum 503 and passes back to the front side of the flanged head of the drum 502 and up over the top of the latter and thence rearwardly over the other division of said double drum 503, being guided to proper engagement with the latter by passing under a shield 502$^a$ and between a flange 502$^b$ thereof and a guard finger 502$^c$ pivoted to said shield and spring-held. It will be obvious that this disposes the chain in effect spirally laying an advance portion of it parallel with a following portion at the upper sides of the drums. The latter are intermittently rotated to advance the chain the length of a link thereof, and the drums are constructed to so engage the chain as to successively pair the neighboring eyes of links brought into parallelism so that connecting cross links may be applied to such eyes while the drums are stationary. It will be understood that between the intermittent turnings of the drums upturned ends of pieces of correct length cut from wire $b$ will be threaded through the paired eyes and up-set upon or closed around the same to permanently connect them, except of course when the oncoming convolution of chain is to constitute the final lengthwise strand of the fabric.

It will be understood without further description that disposition of the continuous chain in the manner set forth and the application thereto of connecting cross links between intermittent advances will result in producing fabric in tubular form and inasmuch as every fifteenth link is engaged by open hooks of the following link it will be obvious that in such tubular or looped fabric there will be a line of open hooks extending across the fabric or lengthwise of the tube. It will be equally obvious that unhooking of the fabric along this line will result in the delivery of a completed fabric in flat form. My invention extends to the doing of this unhooking automatically, though it is not limited to such feature for obviously the unhooking might be done by hand either while the fabric was still on the machine or after its removal therefrom in the tubular form.

The width of the fabric is determined by suspending the supply of cross links while the final convolution of chain for a lengthwise strand of the fabric is passing over the drum 502 and the initial convolution of chain for the next fabric is passing over the drum 501. It will be clear then that this initial convolution of chain for the next fabric will be connected to the just-completed fabric only by engagement of the open hooks of the first chain link for the new fabric with the eyes of the final chain link of the completed fabric. Consequently disengagement of the line of open hooks, as before referred to, will disconnect the completed fabric from the following one.

For the purpose of having the order of description follow as nearly as possible the order of operation of the machine, the automatic unhooking and delivery of the fabric will be described at a later point in this specification and I shall next describe mechanism for intermittently advancing the drums and after that the mechanism for forming and applying the cross links and then the arrangement for suspending the supply of cross links to define the width of the fabric. The three drums 501, 502 and 503 are geared to run exactly in time with each other. Gear wheels 505 and 506 of the same size are secured to the drums 501 and 502 respectively and a gear 507 of this size is secured to the shaft 504 to which the drum 503 is fastened, see Figs. 37 and 38. The gears 505 and 507 are connected to run in unison by an idle gear 508, see Fig. 2, the gear 507 being driven from the gear 505. The latter is driven by a gear wheel 509 located below it, see Fig. 2, and secured to a shaft 510 which also has fastened to it a gear wheel 511 which drives the gear wheel 506 and is the same size as the gear wheel 509. The latter is in mesh with the larger gear 512 of a pair of gears both secured to a shaft 513 in bearings upon the frame of the machine, as shown in Fig. 37, and the smaller gear 514 is in mesh with a gear 515 (Fig. 2) secured to a similar shaft 516 which also has secured to it a bevel gear 517. Said bevel gear is in mesh with a similar bevel gear 518 secured to a shaft 519 in bearings on the machine frame and extending lengthwise of the machine, see Fig. 35. There is secured to this shaft 519 a six-toothed ratchet wheel 520 (Figs. 41 and 42) and loose upon this shaft adjacent said ratchet wheel is a disk 521 carrying a pivoted pawl 522 pressed by a spring 523 into engagement with the ratchet wheel. A gear wheel 524 secured on the hub of the disk 521 drives the latter, which in turn through the medium of the pawl 522 advances the ratchet wheel and the train of gearing above pointed out leading to the drums carrying the chain. In order to provide for the requisite intermittent turning of said drums notwithstanding continuous rotation of the gear 524 and disk 521 carrying the pawl 522, the latter is permitted to engage the ratchet wheel during only a fraction of a rotation, the particular arrangement here shown being designed to provide for turning the ratchet wheel one-sixth of a rotation during a revolution of the pawl 522. The control of the pawl to this end, with provision for adjustment to regulate duration of its effective engagement with the ratchet, is had through the following described instrumentalities: A stationary cylindrical head 525 surrounds the ratchet wheel 520 and the pawl 522, said cylindrical head having a hub through which the shaft 519 loosely extends and being shouldered to fit a shouldered portion of the disk 521, as shown in Fig. 41. This relationship between the cylindrical head, the shaft and the disk is merely for purposes of support and exclusion of dirt, for, as stated, the head is stationary. It is held to the framework of the machine by a bracket 526. On its interior are mounted two curved shoes 527 and 528 against which a tail 529 of the pawl 522 runs when the pawl is revolving and disengaged from the ratchet wheel. It will be obvious that, as illustrated in Fig. 41, the pawl will engage the ratchet upon the tail 529 passing the end of the shoe 527, and that when said tail strikes the end of the shoe 528 it will be disengaged from the ratchet. The shoe 528 is adjustably secured to the cylindrical head by screws 530 which pass through short circumferential slots in the head and enter the shoe. Obviously this provides for properly regulating the extent of movement to be imparted to the ratchet wheel 520 by said pawl.

The gear wheel 524 is continuously driven by a gear wheel 531 loose on a line shaft 532 journaled in suitable bearings on the framework of the machine and said gear wheel 531 is slidingly and rotatively engaged with a clutch sleeve 533 also loose on the shaft and similarly engaged with a gear wheel 534 loose on the shaft and in mesh with a gear wheel 535 secured to a sleeve 536 loose on the shaft 519, said sleeve carrying a worm wheel 537 engaged by a worm 538. The latter is fastened to a shaft 539 which carries tight and loose pulleys 540 and 541. The shaft 539 is of course the primary drive shaft of the machine and the shifting of a belt from the loose pulley 541 to the tight pulley 540 sets the machine in motion. The clutch connecting the sleeve 533 and shaft 532 provides for disconnecting the assembling department of the machine while the chain-making department continues to operate, as for example when a length of chain is to be made for laying an initial convolution, as hereinbefore referred to, the chain-making devices being driven by gear 535 through gear 16$^a$ in mesh with it and secured to shaft 16. To disconnect the assembling department it is only necessary to shift the sleeve 533, disengaging it from the gear wheel 534. The sleeve at all times maintains rotative engagement with the gear wheel 531. A yoke 533$^a$ is here shown for shifting the clutch, the yoke being suitably pivoted and equipped with a handle 533$^b$.

The drums 501, 502 and 503 are of course equipped to effectively engage the chain so that the correctly calculated intermittent turning of said drums through the mechanism just described will definitely advance the chain a link at a time. It will be remembered that the ratchet wheel 520 is designed to be turned one-sixth of a rotation at a time and it is here to be noted that the drums are designed to be likewise turned one-sixth of a rotation at a time. Consequently each drum is equipped with a series of six devices to successively engage the links, the diameter of each drum and the equidistant spacing apart of such devices being of course calculated to accord with the length of the links. The devices on the drums 501 and 502 are exactly alike though reversely disposed, so it will suffice to describe in detail only one of these two sets. Referring then to the drum 501 there is secured to the inner side of its flanged head a series of blocks 542 with portions projecting from the periphery of the drum, such portion of each block being flaringly grooved or slotted lengthwise as shown at 543, (Figs. 35 and 37), and also flaringly grooved crosswise or transversely as shown at 544, the bases of the cross grooves or notches in these portions of the blocks, being separated from each other by the groove or slot 543, and being higher than the base of the latter groove and the base of the outer one of said transverse grooves or notches constituting an anvil, as will be hereinafter described in connection with the cross link applying. In the center of the groove 543 forward of the cross groove stands a blade 545 tapering toward its outer end and laid back on a curve as to its front edge. This blade is designed to thrust itself between the side bars $a'$ of the link and bear against the rear end of the link head between the eyes thereof and properly guide the latter down into the cross groove while the side bars $a'$ of the following link enter the groove 543 on opposite sides of said blade 545 and the side bars of the link ahead occupy said groove 543 forward of the cross groove 544. Obviously the engagement thus effected between the chain and the drum is a positive and definite one providing for the measured advance of the chain by the drum.

The equipment of the drum 503 is somewhat similar though there is no occasion here for a special construction of block or feed tooth such as used on the drums 501 and 502 because the latter, as will be hereinafter described in detail, are required to serve not only for advance of the chain but also in combination with other devices for applying the cross links. The drum 503 has spaced polygonal flanges 547 on each of which is secured a series of blocks 548, the same being centrally grooved horizontally and formed with elevated portions 549 to constitute feed teeth, it being understood that the chain, after passing rearwardly from the drum 501, is engaged successively by the blocks 548 on one of the polygonal flanges 547 in line with the blocks 542 of the drum 501, the groove of the blocks 548 receiving links of the chain in such a manner that the hooked ends of one link lie in the forward part of the groove and the side bars of the link ahead in the rear portion of the groove and the laterally-projecting eyes of the latter link in front of the teeth 549 so that the latter act upon the other forward sides of said eyes to advance the chain, after the manner of a sprocket wheel.

It has heretofore been stated that the drum 503 is equipped the same as the drum 501 with the specially-formed blocks 542 and it will be understood that, the chain having been fed over the drum 503 by the series of projections of feed teeth in line with the blocks 542 of the drum 501, said chain drops down in a loop and passes forward and up over the drum 502 and will be engaged by the blocks 542 of the latter in just the same way that the blocks 542 of the drum 501 engage the links, which has already been explained. It will now be clear that as the drums rotate the chain will be disposed spirally and neighboring eyes of parallel links will be successively paired between the feed blocks 542 of the two drums 501 and 502. It will be understood that the second convolution of chain after leaving the blocks 542 of the drum 502 passes to the blocks 548 of the series secured to the other one of the polygonal flanges of the drum 503, which other flange is in line with the blocks 542 on the drum 502.

In order to insure disconnection of the chain from the drum 503 and guard against the possibility of its becoming entangled in the mechanism, a strip or bar 550 is secured to the framework by a depending portion or stem, see Fig. 34, said bar extending transversely or crosswise the said drum in a vertical plane substantially tangential to said drum. The convolutions of chain pass down the outer or rear side of said bar and the advance convolution, after so leaving the second series of feed blocks on the drum 503, is cared for in the manner hereinafter described to insure delivery of the fabric in a desirable state.

*Cross link forming and applying.*—It has been stated that the blocks 542 of the drums 501 and 502 besides serving for chain feed purposes constitute anvils. They so serve in connection with link-coupler compressing and clamping heads which insure an exact uniform and fixed positioning of successive paired eyes for the threading therethrough of the cross link. It is of course important in this connection that the drums 501 and 502 be locked immovably in position. To this end the flanged heads of said drums are formed with series of flaring notches 551, as shown in Figs. 36 and 43, adapted to be engaged by the similarly formed upper end portions of plungers 552 sliding in suitable guide-ways in the framework of the machine and having racks 553 in mesh with gear wheels 554 secured to a shaft 555, said shaft having secured to it another gear wheel 556 in mesh with a gear segment 557 on a rocker-piece 558 loose on the shaft 510, see Figs. 2 and 36, and connected by a link or pitman 559 to a vertical slide bar 560 moved up and down in suitable guideways in the framework of the machine by a cam 561 secured to the shaft 532. This is a box cam as to its function of oscillating the gear segment 557, the slide bar 560 having a roller 562 occupying a groove in one side of the cam, see Figs. 38 and 63. The timing is of course such as to provide for unlocking of the drums just as the pawl 522 takes effect to advance the drums, and for the re-locking of the latter just as soon as the said pawl ceases to act.

The eyes of parallel links having been paired in the manner described and the drums locked, clamping heads 563 descend into the cross grooves 544 of the blocks 542 and in front of the blades 545 so as to bear down forcibly upon the links, thereby securely clamping the same against movement while leaving exposed sufficient portions of the neighboring eyes of the links to receive the cross link. The blocks 542 are grooved vertically and centrally in their confronting faces, as shown at 564, Figs. 36 and 37, and said exposed portions of the eyes aline with said grooves, the upturned portions of the length of wire to form the cross link rising through said grooves as hereinafter explained.

The clamping heads 563 are mounted in a vertically reciprocating slide 565 mounted in guideways upon an overhanging portion 566 of the framework, said heads having stems 567 with limited movement in bores of said slide, being backed up by compression springs 568 (see Figs. 44 and 45) and held in place by screws 569 engaging slots in said slide. Each of the clamping heads is formed with a recess 570 to accommodate one of the hooks $a^3$ of the following link, and the inner slide head is cut away on a bevel, as shown at 571 in Figs. 44 and 51, from said recess 570 to its inner side for the purpose of accommodating the cross link which has already been applied to connect the chain link clamped by this head to the parallel link of the next advance convolution of the chain. The portion of each clamping head to one side of the recess 570 bears upon that eye of the associated link which has already received the cross link in a preceding operation or is to receive the cross link in a later operation, and the portion of each clamping head on the opposite or inner side of said recess 570 bears upon the middle of the link between the eyes. As stated, one hook $a^3$ of the following link is accommodated in the recess 570. The companion hook $a^3$ of said following link will be just inwardly beyond the clamping head, all as clearly shown in Fig. 51.

It will be obvious that with the above-described construction and arrangement of parts the two links to which a cross link is to be applied will be fixedly and definitely held in position with the paired eyes $a^2$ over the upper ends of the grooves 564.

The cross link wire $b$ comes in from any suitable source of supply in a direction at right angles to the chain feed. Figs. 34 and 35 show a series of vertically-disposed grooved sheaves 572 and a series of horizontally-set grooved sheaves 573, between which two sets of sheaves the wire passes, these being familiar expedients for straightening and guiding wire for its entrance into a machine which is to convert it into an article of manufacture. Horizontal parallel rods 574, secured in the framework, serve as guides for a reciprocating cross head 575 having a shelf 578 over which the wire passes, said shelf having a flange 579 against which the wire is clamped to feed it by inward movement of the cross head 575. There is pivoted to the cross head above the shelf a wire-clamping dog 580 (Figs. 34 and 35) which is coupled by a link 581 to the upper end of a lever 582 pivoted to the base portion of the framework and vibrated by a horizontal slide bar 583 in suitable guides on the frame and carrying a roller 584 occupying the groove of a box cam 585 secured to the shaft 532, (see Figs. 34 and 58).

The before-mentioned chain-feeding drums 501 and 502 are journaled upon fixed cylindrical blocks 586 and 587 and the cross link wire passes through the block 586 and abuts against a yielding buffer in the block 587. The wire threads through a hole in an oscillatory shell 588 journaled in the head 586 and through an alined hole in a hardened inset 589 in the shell 588. Said hardened inset coöperates with a disk knife 590 accommodated in a recess of the cylindrical block 586 and held stationary by engagement of certain of its cutting notches with projections 586$^a$ in the said recess, as shown in Fig. 37$^a$. The disk 590 is secured to a similarly-formed head 591 on a rock shaft 592 extending through the shell 598. An arm 593 secured to the outer end of said shell is connected by a link 594 which at its lower end is coupled to a lever 595 pivoted intermediate its ends to the framework and having at its opposite end a roller 596 running against the periphery of the cam 561 which carries an exterior cam-piece 562$^a$ to act upon said roller 596 and oscillate the cutting-off shell. A spring 597 applied to the lever 595 completes the oscillation of the shell. The knife disk is adjustable to bring one or another notch to effective position for taking care of wear.

The before-mentioned buffer is in the form of a slide rod 598 occupying a bushing 599 set in the cylindrical block 587 (Fig. 37), said rod having a head against which the end of the wire strikes when it is projected past the cutting-off knife in the feeding action. Such buffer is backed up by a spring 600, the purpose being to insure the proper disposition of the cut-off length of wire by preventing thrust effects in the cutting off from leaving the wire too far projected. There is a recess in the face of the block 587 corresponding to the recess in the face of the block 586 which as before stated accommodates the knife 590, and the projected length of wire spans the space supplied by these recesses and by the gap between the faces of the blocks, which gap is continuous between the two sets of feed heads 542 on the drums 501 and 502. The necessity of this will be apparent when it is considered that cross link forming and driving devices must be so accommodated as to provide for threading bent ends of the cross link wire through the paired eyes of the chain link while the latter are clamped upon a pair of the feed heads 542 in the manner before described.

Figure 62:
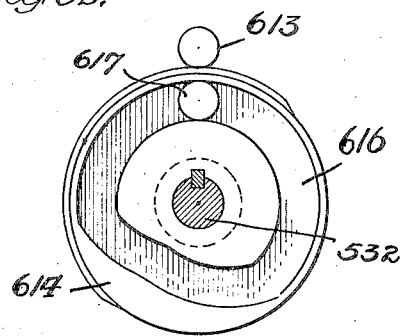
Figure 63:
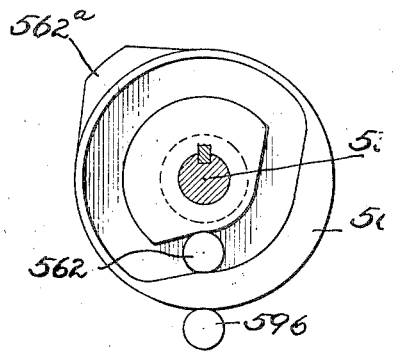

A length of wire having been fed in and cut off sufficient to form a cross link, the next thing to be done is to bend up the ends of this length of wire so as to bring them in line with the grooves 564 in the confronting faces of said pair of feed heads 542. To this end there are journaled in the confronting portions of the two cylindrical blocks 586 and 587 a pair of oscillatory formers 601, see Figs. 53 and 54, cylindrical in the main but having quadrantal portions 601$^a$ at their forward ends. Mandrels 602 in the form of round rods extend through the centers of the formers 601 and project from the inner faces thereof to the same extent that the forming quadrants 601ᵃ project, the latter being spaced from the mandrels sufficiently to accommodate the wire. It will be understood that when the wire is projected it extends directly over alined straight shoulders of the quadrants and under the two mandrels 602, its central portion b' spanning the space between the quadrants. It will be obvious that properly measured turning of the formers 601 in opposite directions will bend the wire around the mandrels so that end portions of the wire will project upwardly at right angles to the central portion, as illustrated in Fig. 56. It will be understood that where the formers will be working to so bend the wire there are narrow vertical spaces 604 between portions of the blocks 586 and 587 and that the ends of the wire are bent upward through these spaces where the wire is confined against lateral movement. Provision is made for retiring the quadrants 601ᵃ and mandrels 602 from these spaces when their work has been done and the bent wire is to be carried upward. Thus the formers have a limited sliding movement in their supports and are connected by a cross head 605 into which extend portions of the mandrels 602, set screws 606 being entered through the cross head and engaging said mandrel portions so that the latter serve for connecting the formers and the cross head and the mandrels and formers will necessarily be withdrawn simultaneously by outward or rearward movement of the cross head. This is effected through the medium of a bell crank lever 607 whose upwardly-extending arm is bifurcated to engage the cross head and whose rearwardly-extending arm is connected by a link 608 to a lever 609. The latter is connected by a link 610 to an arm 611 of a vertical slide bar 612 having a roller 613 running upon the periphery of a cam 614 secured to the shaft 532. The outline of the periphery of this cam, as shown in Fig. 62, is such as to properly time the withdrawal of the mandrels and formers against the stress of a restoring spring 615 applied to the slide arm 611, (see Fig. 36). The same cam 614 serves for oscillating the formers, said cam having a groove 616 (Fig. 62) receiving a roller 617 on another vertical slide bar 618 which has an arm 619 coupled to a vertical bar 620 which at its upper end extends between the formers 601 and has rack teeth 621 on each side. These series of rack teeth mesh respectively with gear wheel 622 secured to the formers. It will of course be understood that the latter rotate upon the mandrels 602 which are non-rotatable and that there are recesses in the supports of sufficient extent to provide for the requisite longitudinal movement of the gears 622 with their formers, said gears sliding through the rack teeth which are wide enough to maintain the full engagement with the gear teeth, (see Fig. 53.)

The wire having been formed as above described and the formers and mandrels having been withdrawn, the next step is to project the partially-formed cross link upward, threading its bent ends through the paired eyes of the chain links. The narrow spaces 604 before mentioned aline with the grooves 564 in the confronting faces of the anvil blocks 542 so that the bent ends of the wire will readily pass from said spaces into said grooves. To insure this said grooves may be made somewhat flaring at their lower ends, as shown in Fig. 36. Then as an additional means of maintaining said partially formed link properly set or disposed for engaging the paired eyes of the chain links I prefer to clamp it between vise jaws and not rely merely upon pushing it upward by a driving head. When the wire is projected through the recesses between the cylindrical blocks 586 and 587 in the manner before described the central portion of the projected length of wire will be positioned directly over the cross groove of a head 623 on the upper end of a vertical slide bar 624 which extends upwardly between said cylindrical blocks as shown in Figs. 36 and 37 and at its lower end is coupled to a link 625 which is in turn coupled to a lever 626, the latter being linked to a similar lever 627 which carries a roller 628 in the groove of a cam 629 secured to the shaft 532. The groove of this cam is properly shaped to correctly time the reciprocations of the slide 624 and of course the latter in rising carries the partially-formed cross link upward. The slide bar 624 is set into portions of the blocks 586 and 587, as shown in Fig. 36, and is of a thickness to extend completely across the spaces 604, it being understood of course that the formers and mandrels withdraw from these spaces as the said bar rises. To avoid any possible conflict between the slide and the mandrels the slide is cut away at the rear along both sides, as shown in Figs. 36 and 37, and the head 623 is similarly cut away. The cross groove in the latter is forward of these cut-away portions so that it extends the full width of the head, affording a seat for the central portion of the partially-formed cross link of ample extent to firmly support the same when driving it upward and through the paired eyes of the chain links.

Just forward of the slide bar 624 extends another slide bar 630 which has a narrow rearwardly-projecting head 631 overlying a hardened inset 631ᵃ adapted to engage the upper side of the middle portion of the partially-formed link, as illustrated in Fig. 51 (see also Fig. 55), clamping the same against the head 623. When the formers and mandrels have retired and the head 623 engages the partially-formed link, the slide 630 will operate to first clamp the link upon said head and then rise as one with the slide 624 so that the link will be carried upward securely clamped between the heads 623 and 631. The proper action of the slide 630 is obtained by a box cam 632 secured to the shaft 532, and suitable connections comprising a lever 633 carrying a roller 633ª occupying the groove of said cam, a lever 634 linked to said lever 633, and a link 635 connecting said lever 634 to said slide 630. Of course the slide 630 must release the cross link so that the fabric can be advanced, and the outline of the groove of the cam 632 is cut to provide for this. However, before the link is released, the upturned ends of the wire for the cross link must be closed upon the eyes of the chain links, the principal purpose of clamping the cross link wire as above described being to hold it securely while this operation is performed.

Passing now to the means for performing the last-mentioned operation it will be remembered that the clamping heads 563 are carried by a vertically-reciprocating slide 565. This slide also carries formers for bending the ends of the cross-link wire inward and also devices for closing the hooks of the cross link around the eyes of the chain links. The first-mentioned devices are in the form of blocks 637 secured to inner confronting faces of the slide 565, as shown in Fig. 44, and having lower end edges of limited area under which lie the neighboring hooks $a^3$ of the paired chain links, which hooks, as before explained, lie beyond the heads 563. Just above these limited lower end portions of the blocks 637 there are surfaces curving toward each other and grooved, as shown at 638, these grooves coming in line with the paired eyes of the chain links and so in line with the upturned ends $b^2$ of the partially-formed cross link $b'$. It results that when said cross link is driven upward, clamped between the heads 623 and 631, these upturned ends of the wire will be bent inward and toward each other, as illustrated in Fig. 51. It will of course be understood that while this is taking place the slide 565 is dwelling at its lower clamping position. Said slide is reciprocated through the medium of a vertical bar 639 (Fig. 36) bolted to the slide at its upper end and bolted at its lower end to another slide bar 640 which carries a roller 641 occupying the groove of a box cam 642.

The above-described operation forms the ends $b^2$ of the cross link into hooks, as illustrated in Fig. 51, the ends of which project beyond the curving surfaces of the blocks 637. For the purpose of closing these hooks a second slide 643 is mounted upon the slide 565 and carries a pair of pivoted spring-connected jaws 644 whose lower acting ends normally rest against inclined surfaces of the blocks 637, as shown in Fig. 44, these acting end portions having grooved extremities for engaging the inwardly-projecting ends of the wire. When the slide 565 moves downwardly to clamping position the slide 643 accompanies it and gains upon it by means of the latter slide being pivotally connected to a lever 646 at the rear extremity thereof and said lever being pivoted intermediate its ends to the slide 565 and at the time fulcrumed at its forward end, see Fig. 36. Hence the jaws 644 are brought down to engagement with the wire, their lower extremities having passed from the upper inclined surfaces of the blocks 637 outwardly over intermediate inclines to lower inclined surfaces through which grooves 638 extend. When the partially-formed cross link $b'$ has been driven up through the paired eyes of the chain links and the ends $b^2$ formed into hooks projecting beyond the curving under-surfaces of the blocks 637, as shown in Fig. 51, the slide 643 partakes of downward movement independently of the slide 565 so that the acting end portions of the jaws 644 act upon the end portions of the wire to close down the hooks and complete the application of the cross link to the chain links as illustrated in Fig. 51ª. Independent reciprocation of the slide 643 is effected through the medium of the lever 646 which is connected by a link 647 to a slide 648, the latter having a roller 649 riding upon the periphery of the cam 585 which has a projection 650 to act upon said roller. A spring 651 normally pulls the slide 648 down, elevating the slide 643. When the cam acts, in opposition to said spring, the fulcrum of the lever is shifted to its point of connection with the slide 565.

In order to prevent the cross-links from being closed down so closely over the eyes of the chain links as to impair the flexibility of the fabric, I fix a pair of pins 651 to the framework, which pins project where the end-portions of the cross-link will strike upon them.

*Suspending cross link supply.*—It has been heretofore stated that the lateral dimension of the fabric is determined by suspending or omitting the supply of cross links while the final length of chain for a fabric and the first length of chain for the next fabric are passing over the drums 501 and 502; also a cross-link is omitted every fifteenth chain link so there will be none along the line where the fabric is to be unhooked. As the machine is here shown this is accomplished by automatically disconnecting the shaft 532 from the driving gear 531, though of course it might be otherwise accomplished. The said shaft and driving gear are connected by a rolling key 655 convexo-convex in cross section, see Fig. 48, adapted to occupy a similar form of recess extending longitudinally of the shaft 532 and adapted to roll or rock into a recess or seat 656 formed in the interior of the hub 531ª of the gear 531 to rotatively connect the latter and the shaft. These parts are so connected so long as the application of cross links continues but every fifteenth chain link (i. e. whenever an open-hook link arrives at the top of the drum 501) the shaft and gear are disconnected and upon application of the final cross link of a fabric will remain disconnected so as to suspend the application of cross links during the period above mentioned. To this end said rolling key is controlled by a circular pattern band 657 which is removably set in a fixed holder 658 having a circular track for the band to run in. The band has a complete series of gear teeth 659 in one edge and is especially formed in the opposite edge to provide for the necessary control of the rolling key. A pinion 660 meshes with the gear teeth 659, said pinion being fastened on the upper end of a shaft 661 journaled in bearings on the framework of the machine and having secured to its lower end a crown pin-wheel 662. The before-mentioned disk 521 has a relatively thin peripheral flange adapted to pass between pins of said wheel 662 and at one point is formed with a diagonal slot 663 and a cam lip 664 at one side thereof, as shown in Fig. 2, so that once in every rotation of said disk the pin-wheel will be turned one step by reason of a pin thereof being forced through the diagonal slot to the opposite side of the disk.

It will be remembered that the disk 521 rotates continuously with the gear 524 and so the pin-wheel will be regularly turned a step at a time and will correspondingly turn the pattern band 657. The arrangement is such as to provide for advance of the pattern band one step for each chain link of the fabric and the special formation above mentioned as existing in the edge of the band opposite that having the gear teeth 659, provides for disconnecting the shaft 532 and gear wheel 531 when the first link of each strand of the chain arrives at the top of the drum 501 and further for keeping said parts disconnected while the set of fifteen chain links, beginning with the first of a new fabric, passes that point. Thus the band is notched in that edge at intervals, as shown at 665, and at one place through an area which passes the lowest point where the band is supported during the time when the first strand of a new fabric is passing over the drum 501, notching being thus shown at 665ª in Fig. 64. A slide bar 666 suitably guided in the framework has a top portion 667 extending over the band and having a foot 668 adapted when a plain or unnotched portion of the band is directly under it to rest thereon but when a notched portion of the band is under it to pass down through the same. When said slide is in its upper position with its foot resting on the band the shaft 532 and gear 531 are rotatively connected but when the slide lowers by reason of the notched part of the band arriving under its foot 668 the shaft and gear will be disconnected. This is effected through the following described connections: The said slide bar has a downward extension 669 which is coupled to a bell crank lever 670 pivoted on the framework of the machine. An upstanding arm of this bell crank lever bears against a toggle joint, one link 671 of which is fastened to the rolling key 655 and the other link 672 of which slides through a cylinder 673 pivoted at its closed end to a disk 674 fast on shaft 532. A spring 675 surrounding the stem of the link 672 within said cylinder tends to thrust said link outward and rock the key 675 in a direction to engage it with the gear recess 656. So long as the foot 668 rests upon an unnotched or unbroken part of the band 657 this condition prevails, that is to say the said spring keeps the key 655 seated in the recess 656. However, when the notched portion of the band arrives under the foot 668 a spring 676, which is superior to the spring 673, lowers the slide 666, rocking the bell crank 670 and operating the toggle joint against the stress of said spring 673, thereby rolling the key into the recess of the shaft 532 and disconnecting said shaft and the gear 531. The hub 531ª of the latter then rotates around the shaft and key and no motion is transmitted to the link feeding and applying devices. For the purpose of lifting the slide bar 666 when the fifteenth chain link of the new fabric has passed and the cross link applying is to be resumed, there is secured to the shaft 519 a cam 678 adapted to act upon a roller 679 carried by said slide bar. When the foot of the slide bar is upheld by a plain portion of the pattern band this roller is above the line of travel of the cam but when the slide bar has dropped by reason of the foot passing into the notched portion of the pattern band, said roller is brought into the line of travel of the cam. While the slide will be lifted each time the cam passes, the rotative connection between the shaft 532 and the gear 531 will not be reëstablished because the slide immediately drops again so long as the notched portion of the band is under its foot and the timing is such that the seat 656 does not arrive opposite the key 655 while the spring 673 is free to thrust the key out, unless the slide is held up after being elevated by the cam, that is held up by reason of the plain portion of the pattern band arriving under the foot 668.

*Delivering finished fabric.*—I have before stated that after two convolutions of chain have been united by cross links the advance convolution would be properly cared for by the machine so that as convolutions multiplied into a finished fabric the same would be properly conditioned for delivery. To this end I provide extensions of both the drum 502 and the drum 503 and also provide a fixed guide plate for the fabric to overlie. Referring first to the extension of drum 502, there is secured against the end thereof farthest from the series of feed blocks 542 a circular plate 700, (see Fig. 37), projecting as a flange beyond the gear wheel 506, and there is secured to this plate a circular series of longitudinally-extending arms 701 forming a sort of reel, said arms being notched in their outer edges to receive successive strands of the fabric chain. Referring next to the extension of the drum 503 it will be noted by reference to Fig. 38 that the shaft 504 is extended considerably beyond said drum. At a distance from the latter on that shaft corresponding with the outer ends of the before-mentioned arms 701 there is secured a polygonal disk 703 between which and the drum 503 extend a series of plates 704 formed with alternating elevations and depressions and with spaces between the plates. The chain, having passed rearward over the second series of blocks 548 on the drum 503, goes down in a loop under the same and thence passes forward and over a band 707 secured to the drum 502 and passes forward and into the first of the series of spiral depressions formed by the plates 704 on the extension of the drum 503. Thence the chain loops down again and passes back and up over the extension of the drum 502, engaging a series of the notches of the reel arms 701. The chain passes around and around over the extensions of these drums 502 and 503 which by their formation keep the lengths of chain spread apart and the cross links alined, said links lying in recesses of the plates 704 on the extension of the drum 503. When the fabric goes beyond the reel 701 it passes over a fixed plate or apron 708 which is secured to a bracket 709 on the framework, but the fabric continues to be engaged with a further extension of the drum 503. This takes the form of polygonal disks 710 and 711 loose upon the shaft 504 and connected by plates 713 somewhat similar to plates 704 but differing in that their elevated portions come to a point instead of being truncated as are the elevations of the plates 704. The extent of this last-described reel is such as calculated to carry a complete fabric and interlocking of the cross links of the fabric with this reel by seating in the spaces between the elevated portions of the plates 713 is such that the automatic unhooking of the fabric hereinbefore mentioned can be effected by a slight reverse turning of this reel relatively to the reel composed of the disks 703 and plates 704. To this end the disk 710 is arc-slotted as shown at 714, Fig. 43, and a pin 715 secured in the disk 703 projects through said slot and a spiral spring 716 is attached to said pin and carried around a hub of the disk 710 and secured to the latter. Thus the disks 703 and 710 are connected for rotation together but the connection is a yielding one which permits reverse rotation to a limited extent of the reel of which said disk 710 is a part.

The timing of the reverse rotation of the delivery reel is effected by the same pattern band 657 which effects the suspension of application of cross links though not of course by the same formation of said band. It is obvious that once in every complete rotation of the band there should be a complete fabric delivered. At a suitable point in said band there is a hole 717 and alongside the slide bar 666 is a second slide bar 718 which has a top portion 719 extending over the inner side of the pattern band and having a depending pin 720 adapted to enter said hole 717 once in each complete rotation of the pattern band. Except when the band is in the one position which permits of this, said pin rests upon the plain surface of the band and the slide bar 718 is upheld against the stress of a spring 721. A lower extension 722 of the slide 718 is coupled to a link 723 (Fig. 47), which link is in turn coupled to a bell crank lever 724 and this bell crank lever bears upon a toggle joint similar to that before described as controlling operative connection of the shaft 532 and gear 531, though in this instance throughout the greater part of the rotation of the pattern band there is disconnection instead of connection of driving and driven parts. The driven element is a shaft 725 journaled in suitable bearings on the machine frame and carrying affixed to it a segmental disk 726 which carries a toggle joint (Fig. 65), the latter comprising a link 727 sliding in a cylinder 728, the latter pivoted at its closed end to said disk and containing a spring 729 for thrusting said link outwardly, said toggle also comprising a link 730 fastened to a rolling key 731 convexo-convex in cross section and occupying a similar recess in the shaft. A gear wheel 732ª loose on the shaft and in mesh with the gear wheel 524 has a hub adapted to travel over the key when the latter is within the recess of the shaft but adapted to act against the key and rotate the shaft when the key is projected by the spring 729.

Normally the key is kept in the recess by the restraint imposed upon the spring 729 by the bell crank 724. However, when the hole in the pattern band arrives under the pin 720 the latter drops into said hole, the slide 718 lowers and the bell crank 724 retires permitting the spring 729 to engage the key 731 with the gear wheel, whereupon the shaft 725 is rotated but only to a limited extent because very soon the slide 718 is again lifted. This is effected by the cam 732 on the shaft 519 similar to the cam 678 and adapted to act upon a roller 733 carried by the slide 718. Said shaft 725 carries a disk 734 having a peripheral cam projection 735 adapted to run between roller studs 736 on a lever 737 and vibrate said lever. The latter is connected by a link 738 with an arm 739 secured to a shaft 740 which extends lengthwise the rear fabric reel somewhat below the same as seen in Figs. 2 and 34, being supported at its outer end in a bearing on a column 741 which supports the outer end of the shaft 504. Secured to this shaft 740 is an arm 742 projecting up alongside the disk 711. The latter carries a series of lugs or projections 743 adapted to successively wipe past the end of the arm 742 but with each intermittent advance of the reel one of these projections is brought up to the arm, not passing the same, so that said arm stands ready to act upon such projection to reversely turn the outer reel. This it does as a result of the rotation of the shaft 725 and the consequent rocking of the shaft 740.

In order to insure unhooking of the fabric by this reverse rotation of the outer reel it is desirable that a stop be interposed to prevent the fabric from being simply moved backward bodily. In other words, it is desirable to definitely block the fabric along a line in advance of that where the open hooks come so that when the outer reel is reversely rotated the fabric may buckle where it extends from the top of the plate 708 over to said reel, such buckling taking place at the joint where the open hooks are so that said hooks will simply drop free from the eyes they have been engaging. This is best illustrated in Fig. 57. The following means are employed for holding the fabric so as to insure this effect: A bar 744 is supported by arms 745 secured to a rock shaft 746, said bar extending lengthwise above an upper portion of the plate 708 normally free from the fabric overlying said plate. Said rock shaft extends to the other side of the machine where it carries a crank arm 747 connected by a link 748 to an arm 749 secured to the shaft 555, which, it will be recalled, is an oscillating shaft. It is true that this shaft oscillates more often than necessary so far as the function of the bar 744 is concerned, but it is convenient to connect that bar to said shaft and there is no harm in having the bar oscillate more frequently than necessary. By engaging with the ends of a line of hooks, said bar will hold the fabric where it overlies the plate 708 against movement in a reverse direction when the reverse turning of the outer reel takes place as above described. This engagement of the bar with the fabric is of course timed to be effective when such reverse rotation occurs and in consequence the unhooking of the fabric will take place in the manner described and as illustrated in Fig. 57. Of course this must be timed in accordance with the chain-making mechanism in the matter of leaving hooks over at intervals so that the line of open hooks will be at the proper place to insure the buckling and unhooking. To secure proper adjustment in this regard it is only necessary to turn the ratchet 191 relatively to the pawl 190.

As a precaution against injury to the machine which might otherwise be caused by a hitch in the chain-making operation, I preferably provide for an automatic disconnection between the driving gear 16$^a$ and the main shaft 16 of the chain-making department. Thus as shown in Figs. 39 and 40 said gear is loosely mounted upon the shaft and there is secured to the shaft a disk 16$^b$ carrying a pivoted abutment piece 16$^c$ in the nature of a pawl urged by a strong spring 16$^d$ to a position where its nose confronts a driving lug 16$^e$ secured to the inner portion of the gear wheel flange which encircles said disk. In the event of a hitch in the chain-making operations offering obstruction to continued operation of the mechanism, the driving lug 16$^e$ will cam past the nose of the abutment pawl 16$^c$ rocking the latter against the tension of the spring 16$^d$ and causing the opposite end of the pawl to become engaged and be retained by a spring-pressed detent piece 16$^f$ notched for the purpose.

What is claimed is:

1. The combination of mechanism for forming and connecting wire links into a continuous chain, and mechanism for disposing such chain in parallel lengths and uniting the latter by cross-links.

2. The combination of mechanism for forming and connecting wire links into a continuous chain, leaving certain links at uniform intervals separably engaged, and mechanism for disposing such chain in parallel lengths and uniting the latter by cross-links, the lengths of chain being measured by the points of separable engagement of links.

3. The combination of mechanism for laying parallel lengths of wire-link chain, and mechanism for forming cross-links and applying the same to unite the lengths of chain, with provisions for automatically defining the width of the assembled fabric.

4. The combination of mechanism for laying parallel lengths of wire-link chain, and mechanism for forming cross-links and applying the same to unite the lengths of chain, with provisions for automatically suspending the formation of cross-links in order to define the width of the assembled fabric.

5. The combination of means for spirally advancing a continuous chain, and means for connecting adjacent convolutions of said chain at intervals by cross-links.

6. The combination of means for spirally advancing a continuous chain with convolutions spaced apart, and means for connecting adjacent convolutions of said chain at intervals by cross-links.

7. The combination of means for spirally disposing a chain with convolutions spaced apart and link eyes paired, and means for connecting adjacent convolutions of said chain at intervals by cross links engaging paired eyes of the chain links.

8. The combination of means for intermittently advancing and spirally disposing a continuous chain, and means for connecting adjacent convolutions of said chain by cross links applied between the intermittent spiral advances of the chain.

9. The combination of means for intermittently advancing and spirally disposing a continuous chain with convolutions spaced apart, and means for connecting adjacent convolutions of said chain by cross links applied between the intermittent spiral advances of the chain.

10. The combination of means for intermittently advancing and spirally disposing a continuous chain with convolutions spaced apart and link-eyes paired, and means for connecting adjacent convolutions of the chain between the intermittent advances thereof by cross-links engaging the paired eyes.

11. The combination of means for intermittently advancing and spirally disposing a continuous chain with convolutions spaced apart and link-eyes paired, means for clamping the latter between intermittent advances of the chain, and means for engaging cross links with paired eyes of the chain links while said eyes are clamped.

12. The combination of means for intermittently advancing and spirally disposing a continuous chain with convolutions spaced apart and link-eyes paired, means for clamping the latter between intermittent advances of the chain, means for threading the bent ends of cross links through the paired eyes of the chain links while said eyes are clamped, and means for closing the cross links.

13. The combination of means for spirally advancing a continuous chain with convolutions spaced apart, means for connecting adjacent convolutions of said chain at intervals by cross-links, means for intermittently supplying the latter, and means for automatically suspending the supply of cross links for a convolution of the chain which completes a fabric.

14. The combination of means for spirally advancing a continuous chain with convolutions spaced apart, means for connecting adjacent convolutions of said chain at intervals by cross-links, and means for automatically disconnecting a transverse line of chain links to deliver the fabric flat.

15. The combination of means for spirally advancing a continuous chain with convolutions spaced apart, means for connecting adjacent convolutions of said chain at intervals by cross-links, means for intermittently supplying the latter, means for automatically suspending the supply of cross links for a convolution of the chain which completes a fabric, and means for automatically disconnecting a transverse line of chain links to deliver the fabric flat.

16. The combination of means for successively connecting links to form a continuous chain and closing links of successive series while leaving open end links of such series, means for spirally disposing the chain with convolutions spaced apart and with the open links in transverse alinement, and means for connecting adjacent convolutions at intervals by cross links.

17. The combination of means for successively connecting links to form a continuous chain and closing links of successive series while leaving open end links of such series, means for spirally disposing the chain with convolutions spaced apart and with the open links in transverse alinement, means for connecting adjacent convolutions at intervals by cross links, and means for disconnecting the open links from associated links to deliver the fabric flat.

18. The combination of means for successively connecting links to form a continuous chain and closing links of successive series while leaving open end links of such series, means for spirally disposing the chain with convolutions spaced apart and with the open links in transverse alinement, means for connecting adjacent convolutions at intervals by cross links, means for intermittently supplying the latter, means for automatically suspending the supply of cross links for a convolution of the chain which completes a fabric, and means for disconnecting the open links from associated links to deliver the fabric flat.

WILBER J. PINE.

Witnesses:
ROBERT DOBBERMAN,
LOUIS B. ERWIN.